(12) United States Patent
Butterworth et al.

(10) Patent No.: US 10,379,964 B2
(45) Date of Patent: Aug. 13, 2019

(54) INTEGRATING RESOURCES AT A BACKUP SITE

(71) Applicant: International Business Machines Corporation, Armonk, NY (US)

(72) Inventors: Henry E. Butterworth, Shanghai (CN); Yi Zhi Gao, Shanghai (CN); Long Wen Lan, Shanghai (CN)

(73) Assignee: International Business Machines Corporation, Armonk, NY (US)

(*) Notice: Subject to any disclaimer, the term of this patent is extended or adjusted under 35 U.S.C. 154(b) by 137 days.

(21) Appl. No.: 15/645,540

(22) Filed: Jul. 10, 2017

(65) Prior Publication Data

US 2019/0012238 A1 Jan. 10, 2019

(51) Int. Cl.
*G06F 11/00* (2006.01)
*G06F 11/14* (2006.01)
*G06F 16/11* (2019.01)
*G06F 11/20* (2006.01)
*G06F 11/16* (2006.01)

(52) U.S. Cl.
CPC ...... *G06F 11/1464* (2013.01); *G06F 11/1451* (2013.01); *G06F 11/1662* (2013.01);
(Continued)

(58) Field of Classification Search
CPC .. G06F 11/1464; G06F 11/1451; G06F 11/14; G06F 11/1446; G06F 11/1448; G06F 11/1453; G06F 11/1458; G06F 11/1469; G06F 11/2025; G06F 11/2038; G06F 11/2048; G06F 11/2094; G06F 11/2097; G06F 2201/805; G06F 2201/82;
(Continued)

(56) References Cited

U.S. PATENT DOCUMENTS 8,719,627 B2 5/2014 Watson et al.
8,977,886 B2 3/2015 Bauer et al.
(Continued)

OTHER PUBLICATIONS

Lori Macvittie, "Disaster Recovery in the Cloud: Key Considerations", NetworkComputing, http://www.networkcomputing.com/cloud-infrastructure/disaster-recovery-cloud-key-considerations/1695153012, Feb. 9, 2017, 3 pages.
(Continued)

*Primary Examiner* — Anthony J Amoroso
(74) *Attorney, Agent, or Firm* — Kunzler Bean & Adamson

(57) ABSTRACT

Systems, computer program products, and methods that can integrate resources at a disaster recovery site are provided. One method includes generating, on a primary site, a set of storage snapshots based on combining another set of storage snapshots and incremental changes to mirrored data on a backup site in which the storage snapshots include a second snapshot format utilized on the backup site. The method further includes converting the set of storage snapshots from the second snapshot format to a first snapshot format utilized on the primary site to generate a yet another set of storage snapshots and converting, on the backup site, a set of storage snapshots including the incremental changes and the second snapshot format to the first snapshot format to generate still another set of eighth storage snapshots. The storage snapshots on both sites represent the same data in the same snapshot format without bulk data transfer.

20 Claims, 16 Drawing Sheets

(52) U.S. Cl.
CPC ...... *G06F 11/2025* (2013.01); *G06F 11/2038* (2013.01); *G06F 11/2048* (2013.01); *G06F 11/2094* (2013.01); *G06F 11/2097* (2013.01); *G06F 16/128* (2019.01); *G06F 2201/805* (2013.01); *G06F 2201/82* (2013.01); *G06F 2201/84* (2013.01)

(58) Field of Classification Search
CPC .... G06F 2201/84; G06F 16/11; G06F 16/116; G06F 16/119; G06F 16/128; G06F 16/1794; G06F 16/258; G06F 16/275
See application file for complete search history.

(56) References Cited

U.S. PATENT DOCUMENTS

| | | | |
|---|---|---|---|
| 2016/0048408 A1* | 2/2016 | Madhu | G06F 11/1458 718/1 |
| 2016/0092308 A1 | 3/2016 | Bates | |
| 2016/0132400 A1* | 5/2016 | Pawar | G06F 16/258 707/679 |
| 2016/0292053 A1 | 10/2016 | Antony et al. | |
| 2016/0306719 A1 | 10/2016 | Laicher et al. | |
| 2016/0366218 A1 | 12/2016 | Cors et al. | |

OTHER PUBLICATIONS

Oracle, "Disaster Recovery to the Oracle Cloud", Oracle White Paper, Apr. 2016, 60 pages.

Clearpath Solutions Group, "Disaster Recovery Using Public Could", Clearpath Solutions Group, http://www.clearpathsg.com/disaster-recovery-public-cloud/, known about as early as Apr. 2017, downloaded on Jul. 3, 2017, 3 pages.

Stephen Lawton, "On-Premises Backup and Disaster Recovery Considerations", tom'sIT PRO, http://www.tomsitpro.com/articles/on-premises-backup-dr-considerations,2-796.html, Aug. 27, 2014, 2 pages.

* cited by examiner

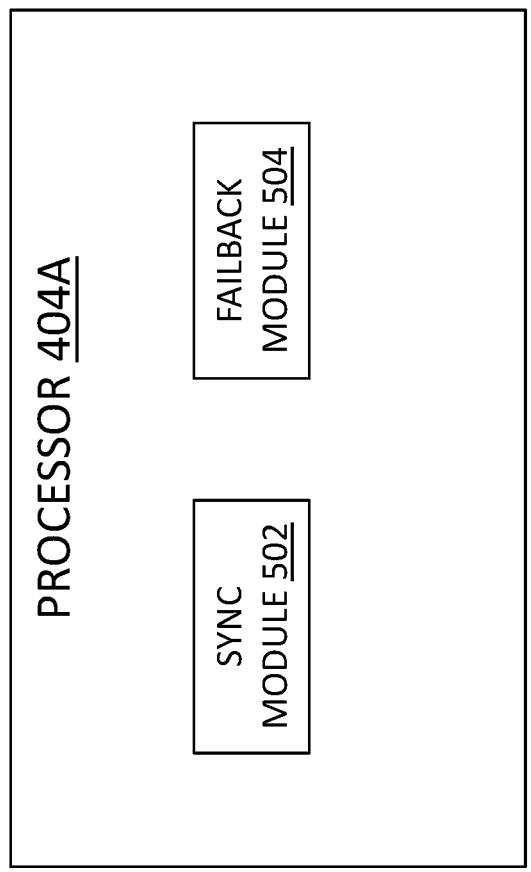

INTEGRATING RESOURCES AT A BACKUP SITE

FIELD

The subject matter disclosed herein relates to storage networks and systems and, more particularly, relates to methods and systems that can integrate resources at a backup site.

BACKGROUND

At times of natural disaster or for other reasons, a storage system and/or network can go offline and/or otherwise become unavailable, which can be referred to as a disaster. If the storage system/network does not include copies of the data stored on the storage system/network, data can be lost, which can be costly in terms of data recovery and/or lost operational time. To ensure that data is not lost during a disaster, many conventional storage systems and/or storage networks utilize a disaster recovery site to store copies of the data.

Different mechanisms exist for making copies of data including application or database level replication, file-system level replication or block storage level replication. Block storage level replication has the advantage that it can be applied as a single generic solution at the storage level so can reduce implementation effort and complexity when compared to a solution involving heterogeneous applications with multiple different application level mechanisms or perhaps with no application level mechanism available.

Conventional block level replication solutions however have the disadvantage that the data is made available at the disaster recovery site in the identical format in which it was stored in the primary site. In order to make use of the data to resume operations after a disaster, the configuration of resources and software at the disaster recovery site must closely correspond to the configuration at the primary site.

While disaster recovery sites assist in data recovery when the storage system/network experiences as disaster, conventional disaster recovery sites and/or the resources maintained thereon are often owned/controlled by a third party. Constrained by the need to maintain disaster recovery configurations closely corresponding to the client's primary resources, these third party owners generally allocate the resources on the disaster recovery site to their clients even when a client is not currently using the resources for disaster recovery operations. As such, conventional disaster recovery sites can be costly for the client because a client is usually required to pay for a service that is not actually being utilized.

Cloud service providers offer infrastructure as a service that may be allocated on-demand, potentially as needed after a disaster and so present an opportunity for reducing cost. Cloud infrastructure may not necessarily be built from the same technology as a client's primary systems though, so it may be difficult to provision a configuration sufficiently similar to the client's primary resources for recovery from a conventional block level replica of the data to be possible.

As a specific example, a client's primary infrastructure may be implemented as a collection of virtual machines provisioned from a private cloud solution based on one hypervisor technology, whereas a cloud service provider may provide infrastructure as a service implemented using a different hypervisor technology with an incompatible format for the virtual machine disk images. In this case, conventional block level replication to the cloud may be insufficient for disaster recovery since the disk images available in the cloud after the disaster would be incompatible with the infrastructure offered as a service by the cloud service provider.

A further issue of significance when considering the use of cloud service providers for disaster recovery is the availability and cost of network bandwidth between the primary site and the cloud service provider's site. Bandwidth may be limited and cloud service providers may charge fees based on the amount of data transferred so there could be considerable cost and time savings from performing incremental data transfers rather than full copies wherever possible.

BRIEF SUMMARY

Methods and systems that can integrate resources at a backup site are provided. One method includes generating, on a primary site, a set of storage snapshots based on combining another set of storage snapshots and incremental changes to mirrored data on a backup site in which the storage snapshots include a second snapshot format utilized on the backup site. The method further includes converting the set of storage snapshots from the second snapshot format to a first snapshot format utilized on the primary site to generate a yet another set of storage snapshots and converting, on the backup site, a set of storage snapshots including the incremental changes and the second snapshot format to the first snapshot format to generate still another set of eighth storage snapshots.

A system includes a resynchronization module that generates, on a primary site, a set of sixth storage snapshots based on combining a set of fifth storage snapshots and incremental changes to mirrored data on a backup site, the sixth storage snapshots including a second snapshot format utilized on the backup site and converts the set of sixth storage snapshots from the second snapshot to a first snapshot format utilized on the primary site to generate a set of seventh storage snapshots. The system further includes a failback module that converts, on the backup site, a set of fourth storage snapshots including the incremental changes and the second snapshot format to the first snapshot format to generate a set of eighth storage snapshots.

Also disclosed are computer program products comprising a computer-readable storage medium including program instructions embodied therewith that can integrate resources at a disaster recovery site. Some program instructions are executable by a processor and cause the processor to generate, on a primary site, a set of sixth storage snapshots based on combining a set of fifth storage snapshots and incremental changes to mirrored data on a backup site, the sixth storage snapshots including a second snapshot format utilized on the backup site. The instructions further cause the processor to convert the set of sixth storage snapshots from the second snapshot to a first snapshot format utilized on the primary site to generate a set of seventh storage snapshots and convert, on the backup site, a set of fourth storage snapshots including the incremental changes and the second snapshot format to the first snapshot format to generate a set of eighth storage snapshots. In some embodiments, the set of seventh storage snapshots and the eighth storage snapshots include a same snapshot format and represent a same data and/or data stored on the primary site and the backup site are synchronized prior to the primary site resuming operations in a normal mode.

BRIEF DESCRIPTION OF THE DRAWINGS

So that at least some advantages of the technology may be readily understood, more particular descriptions of the embodiments briefly described above are rendered by reference to specific embodiments that are illustrated in the appended drawings. Understanding that the drawings included herein only depict some embodiments, the embodiments discussed herein are therefore not to be considered as limiting the scope of the technology. That is, the embodiments of the technology that are described and explained herein are done with specificity and detail utilizing the accompanying drawings, in which:

FIGS. 5A-5B are block diagrams of various embodiments of a processor included in the DR orchestrator of FIG. 4;

DETAILED DESCRIPTION

Figure 1A:
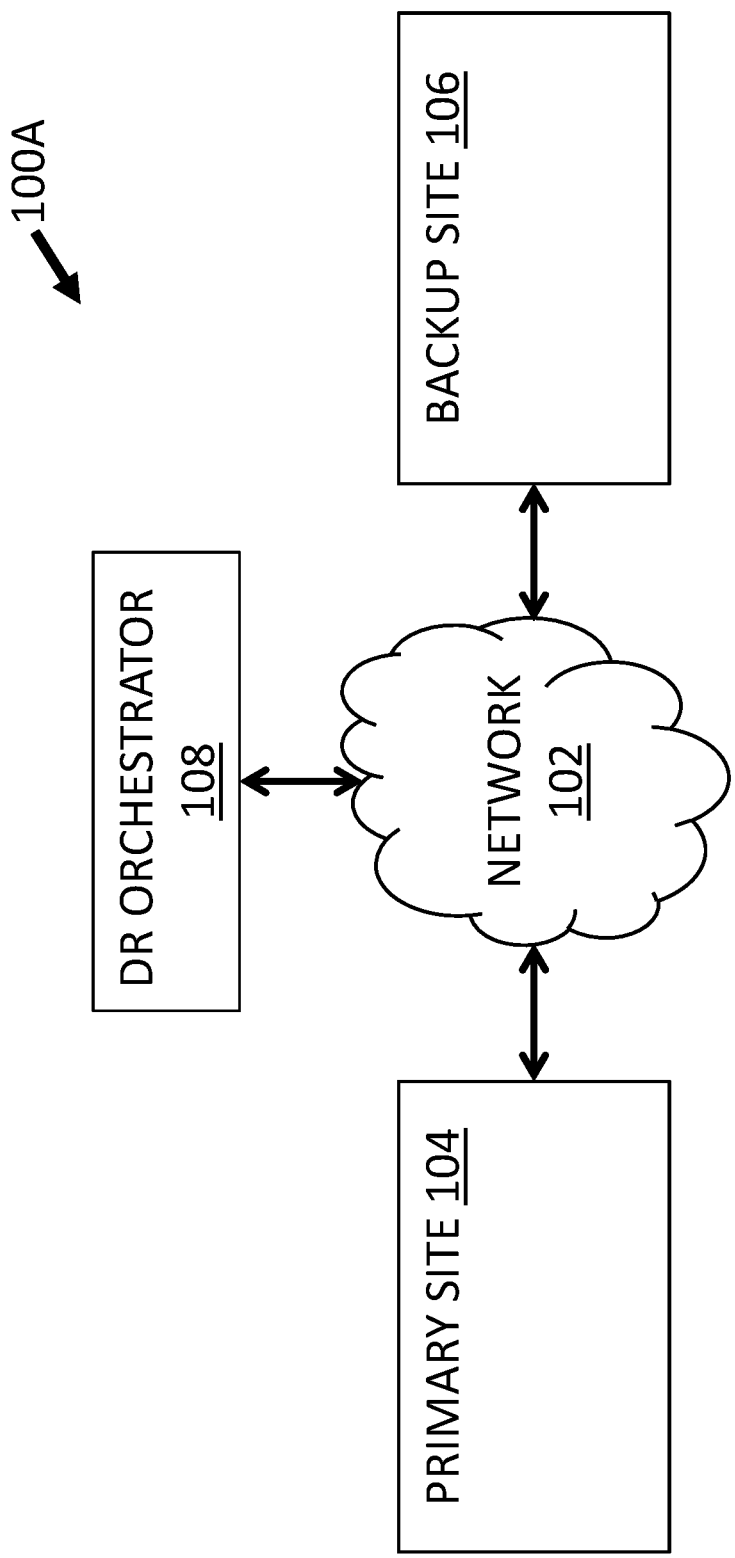
FIGS. 1A-1C are diagrams of various embodiments of a storage system.

Disclosed herein are various embodiments providing methods, systems, and computer program products that can integrate resources at a disaster recovery site. Notably, the language used in the present disclosure has been principally selected for readability and instructional purposes, and not to limit the scope of the subject matter disclosed herein in any manner.

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "including," and variations thereof mean "including but not limited to" unless expressly specified otherwise. An enumerated listing of items does not imply that any or all of the items are mutually exclusive and/or mutually inclusive, unless expressly specified otherwise. The terms "a," "an," and "the" also refer to "one or more," unless expressly specified otherwise.

In addition, as used herein, the term "set" can mean "one or more," unless expressly specified otherwise. The term "sets" can mean multiples of or a plurality of "one or mores," "ones or more," and/or "ones or mores" consistent with set theory, unless expressly specified otherwise.

Further, the described features, advantages, and characteristics of the embodiments may be combined in any suitable manner. One skilled in the relevant art will recognize that the embodiments may be practiced without one or more of the specific features or advantages of a particular embodiment. In other instances, additional features and advantages may be recognized in certain embodiments that may not be present in all embodiments.

The present technology may be a system, a method, and/or a computer program product. The computer program product may include a computer-readable storage medium (or media) including computer-readable program instructions thereon for causing a processor to carry out aspects of the present technology.

The computer-readable storage medium can be a tangible device that can retain and store instructions for use by an instruction execution device. The computer-readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer-readable storage medium includes the following: a portable computer diskette, a hard disk, a random access memory ("RAM"), a read-only memory ("ROM"), an erasable programmable read-only memory ("EPROM" or Flash memory), a static random access memory ("SRAM"), a portable compact disc read-only memory ("CD-ROM"), a digital versatile disk ("DVD"), a memory stick, a floppy disk, a mechanically encoded device such as punch-cards or raised structures in a groove including instructions recorded thereon, and any suitable combination of the foregoing. A computer-readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer-readable program instructions described herein can be downloaded to respective computing/processing devices from a computer-readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer-readable program instructions from the network and forwards the computer-readable program instructions for storage in a computer-readable storage medium within the respective computing/processing device.

Computer-readable program instructions for carrying out operations of the present technology may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer-readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). To perform aspects of the present technology, in some embodiments, electronic circuitry including, for example, programmable logic circuitry, field-programmable gate arrays (FPGA), or programmable logic arrays (PLA) may execute the computer-readable program instructions by utilizing state information of the computer-readable program instructions to personalize the electronic circuitry.

Aspects of the present technology are described herein with reference to flowchart illustrations and/or block diagrams of methods, apparatus (systems), and computer program products according to embodiments of the technology. It will be understood that each block of the flowchart illustrations and/or block diagrams, and combinations of blocks in the flowchart illustrations and/or block diagrams, can be implemented by computer-readable program instructions.

These computer-readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer-readable program instructions may also be stored in a computer-readable storage medium that can direct a computer, a programmable data processing apparatus, and/or other devices to function in a particular manner, such that the computer-readable storage medium including instructions stored therein comprises an article of manufacture including instructions which implement aspects of the function/act specified in the flowchart and/or block diagram block or blocks.

The computer-readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present technology. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

To more particularly emphasize their implementation independence, many of the functional units described in this specification have been labeled as modules. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of program instructions may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

The schematic flowchart diagrams and/or schematic block diagrams in the Figures illustrate the architecture, functionality, and operation of possible implementations. It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Although various arrow types and line types may be employed in the flowchart and/or block diagrams, they are understood not to limit the scope of the corresponding embodiments. Indeed, some arrows or other connectors may be used to indicate only an exemplary logical flow of the depicted embodiment.

A method that can integrate resources at a disaster recovery site includes generating, on a primary site, a set of storage snapshots based on combining another set of storage snapshots and incremental changes to mirrored data on a backup site in which the storage snapshots include a second snapshot format utilized on the backup site. The method further includes converting the set of storage snapshots from the second snapshot format to a first snapshot format utilized on the primary site to generate a yet another set of storage snapshots and converting, on the backup site, a set of storage snapshots including the incremental changes and the second snapshot format to the first snapshot format to generate still another set of eighth storage snapshots.

In various embodiments, the method further include generating a set of third storage snapshots including the second snapshot format and modifying the set of third storage snapshots to generate the set of fourth storage snapshots.

Here, the modifications to the set of third storage snapshots may include the incremental changes.

In additional or alternative embodiments, the method includes generating a set of second storage snapshots including the first snapshot format, converting the first snapshot format in the set of second storage snapshots to the second snapshot format to generate the set of third storage snapshots, receiving, from the primary site, a set of first storage snapshots in the first format, and/or storing the set of first storage snapshots on the backup site to generate the set of second storage snapshots. In further additional or alternative embodiments, the method includes generating the set of fifth storage snapshots based on a set of first storage snapshots stored on the primary site in which the set of first storage snapshots include the first snapshot format and are based on data stored on the primary site and/or convert the first snapshot format in the set of first storage snapshots to the second snapshot format to generate the set of fifth storage snapshots.

A method, in some embodiments, includes establishing a first replication relationship between the primary site and the backup site in a first mode that indicates that the primary site and the backup site include a same data apart from one or more modifications performed on data on the backup site during a period in which the primary site was unavailable. In additional or alternative embodiments, the method includes establishing a first replication relationship between the primary site and the backup site in a first mode that indicates that the primary site and the backup site store a same data in response to generating the set of eighth storage snapshots and generating the set of seventh storage snapshots.

A system that can integrate resources at a backup site includes a resynchronization module that generates, on a primary site, a set of sixth storage snapshots based on combining a set of fifth storage snapshots and incremental changes to mirrored data on a backup site, the sixth storage snapshots including a second snapshot format utilized on the backup site and converts the set of sixth storage snapshots from the second snapshot to a first snapshot format utilized on the primary site to generate a set of seventh storage snapshots. The system further includes a failback module that converts, on the backup site, a set of fourth storage snapshots including the incremental changes and the second snapshot format to the first snapshot format to generate a set of eighth storage snapshots. In various embodiments, at least a portion of said modules include one or more of a set of hardware circuits, a set of programmable hardware devices, and executable code stored on a set of computer-readable storage mediums.

In some embodiments, the system further includes a failover module that generates a set of third storage snapshots including the second snapshot format and modifies the set of third storage snapshots to generate the set of fourth storage snapshots. Here, the modifications to the set of third storage snapshots can include the incremental changes.

In additional or alternative embodiments, the failover module further generates a set of second storage snapshots including the first snapshot format and/or converts the first snapshot format in the set of second storage snapshots to the second snapshot format to generate the set of third storage snapshots. In further additional or alternative embodiments, the failover module further receives, from the primary site, a set of first storage snapshots in the first format and/or stores the set of first storage snapshots on the backup site to generate the set of second storage snapshots.

A system, in some embodiments, further includes a detection module that detects the availability of the primary site. The failover module can generate the set of third storage snapshots in response to the detection module detecting that the primary site is unavailable.

In some embodiments, the resynchronization module further generates the set of fifth storage snapshots based on a set of first storage snapshots stored on the primary site, the set of first storage snapshots including the first snapshot format and are based on data stored on the primary site. In additional or alternative embodiments, the resynchronization module further converts the first snapshot format in the set of first storage snapshots to the second snapshot format to generate the set of fifth storage snapshots.

The failback module, in various embodiments, further establishes a replication relationship between the primary site and the backup site in a mode that indicates that the primary site and the backup site store a same data in response to the failback module generating the set of eighth storage snapshots and the resynchronization module generating the set of seventh storage snapshots. In additional or alternative embodiments, the resynchronization module further establishes a replication relationship between the primary site and the backup site in a mode that indicates that the primary site and the backup site include a same data apart from one or more modifications performed on data on the backup site during a period in which the primary site was unavailable.

In some embodiments, the failback module further facilitates the primary site resuming operations in a normal mode. Further, the set of seventh storage snapshots and the eighth storage snapshots can include a same snapshot format and represent a same data and/or data stored on the primary site and the backup site are synchronized prior to the primary site resuming operations in the normal mode.

Also disclosed are computer program products that include a computer-readable storage medium including program instructions embodied therewith that can integrate resources at a backup site. Some program instructions are executable by a processor and cause the processor to generate, on a primary site, a set of sixth storage snapshots based on combining a set of fifth storage snapshots and incremental changes to mirrored data on a backup site, the sixth storage snapshots including a second snapshot format utilized on the backup site. The instructions further cause the processor to convert the set of sixth storage snapshots from the second snapshot to a first snapshot format utilized on the primary site to generate a set of seventh storage snapshots and convert, on the backup site, a set of fourth storage snapshots including the incremental changes and the second snapshot format to the first snapshot format to generate a set of eighth storage snapshots. In some embodiments, the set of seventh storage snapshots and the eighth storage snapshots include a same snapshot format and represent a same data and/or data stored on the primary site and the backup site are synchronized prior to the primary site resuming operations in a normal mode.

In various embodiments, the instructions further cause the processor to generate a set of third storage snapshots including the second snapshot format and modify the set of third storage snapshots to generate the set of fourth storage snapshots. Here, the modifications to the set of third storage snapshots may include the incremental changes.

In additional or alternative embodiments, the instructions further cause the processor to generate a set of second storage snapshots including the first snapshot format, convert the first snapshot format in the set of second storage snapshots to the second snapshot format to generate the set of third storage snapshots, receive, from the primary site, a set of first storage snapshots in the first format, and/or store the set of first storage snapshots on the backup site to generate the set of second storage snapshots. In further additional or alternative embodiments, the instructions further cause the processor to generate the set of fifth storage snapshots based on a set of first storage snapshots stored on the primary site in which the set of first storage snapshots including the first snapshot format and are based on data stored on the primary site and/or convert the first snapshot format in the set of first storage snapshots to the second snapshot format to generate the set of fifth storage snapshots.

Some instructions further cause the processor to establish a first replication relationship between the primary site and the backup site in a first mode that indicates that the primary site and the backup site include a same data apart from one or more modifications performed on data on the backup site during a period in which the primary site was unavailable. In additional or alternative embodiments, the instructions further cause the processor to establish a first replication relationship between the primary site and the backup site in a first mode that indicates that the primary site and the backup site store a same data in response to generating the set of eighth storage snapshots and generating the set of seventh storage snapshots.

The description of elements in each figure below may refer to elements of proceeding figures. For instance, like numbers can refer to similar elements in all figures, including alternate embodiments of similar elements.

Figure 1B:
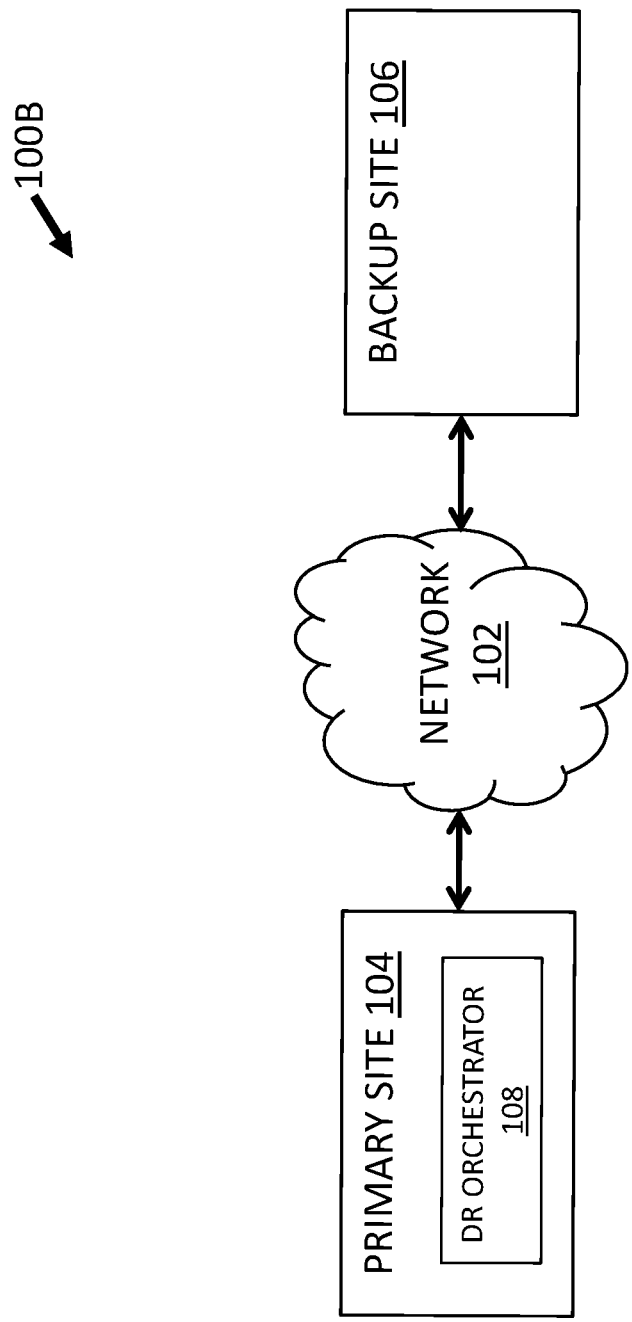
Figure 1C:
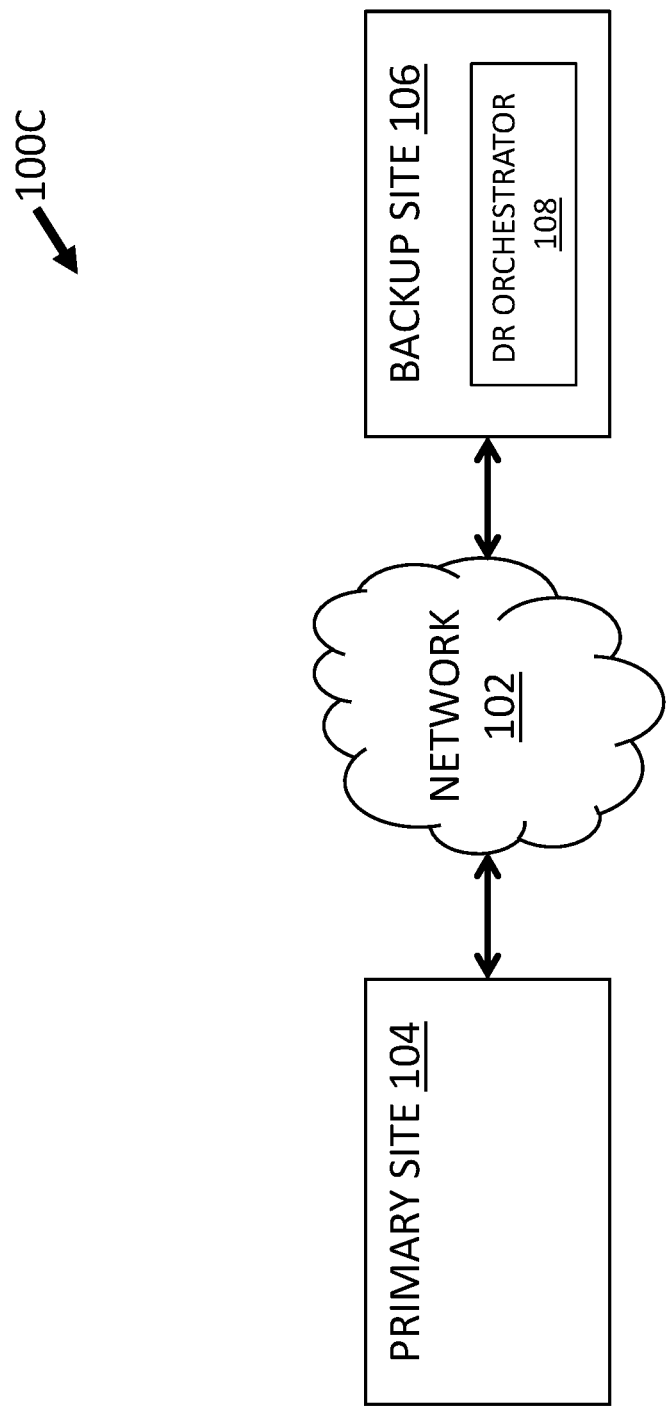

With reference now to the figures, FIGS. 1A-1C are diagrams illustrating various embodiments of storage systems 100A, 100B, and 100C, respectively, which can also be considered a storage network and can also simply be referred individually, in various groups, or collectively as storage system(s) 100. At least in the illustrated embodiment, the storage system 100A includes, among other components, a network 102 coupling a primary site 104, a backup site 106, and a disaster recovery (DR) orchestrator 108 to one another.

The network 102 may be any suitable wired and/or wireless network 102 (e.g., public and/or private computer networks in any number and/or configuration (e.g., the Internet, an intranet, a cloud network, etc.)) that is known or developed in the future that enables the primary site 104 and the backup site 106 to be coupled to and/or in communication with one another and/or to share resources. In various embodiments, the network 102 can include a cloud network (IAN), a SAN (e.g., a storage area network, a small area network, a server area network, and/or a system area network), a wide area network (WAN), a local area network (LAN), a wireless local area network (WLAN), a metropolitan area network (MAN), an enterprise private network (EPN), a virtual private network (VPN), and/or a personal area network (PAN), among other examples of computing networks and/or or sets of computing devices connected together for the purpose of sharing resources.

Figure 2:
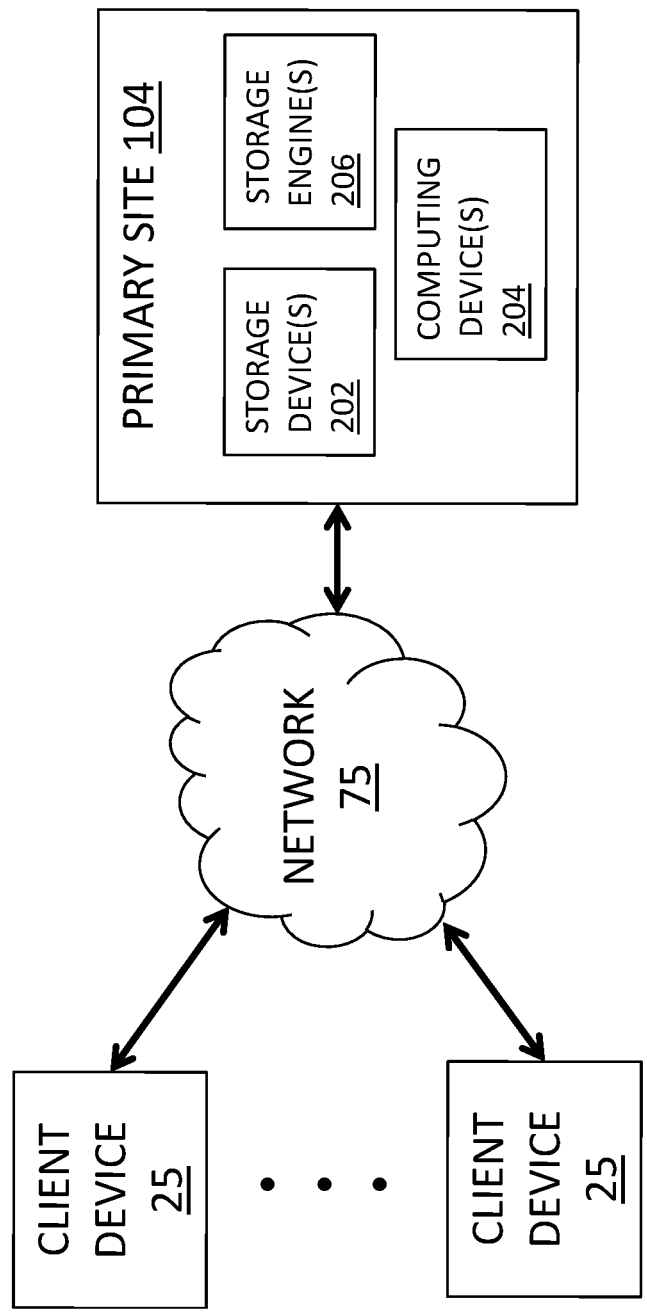
FIG. 2 is a block diagram of one embodiment of a primary site included in the storage systems of FIGS. 1A-1C.

With reference to FIG. 2, FIG. 2 is a block diagram of one embodiment of a primary site 104 (or system) included in the storage system 100 coupled to and/or in communication with a set of client devices 25. A client device 25 can be any computing hardware and/or software (e.g., a thick client, a thin client, or hybrid thereof) capable of accessing the primary site 104 via a network 75, which may be any type of network that is known or developed in the future.

Each client device 25, as part of its respective operation, relies on sending I/O requests to the primary site 104 to write data, read data, and/or modify data. Specifically, each client device 25 can transmit I/O requests to read, write, store, communicate, propagate, and/or transport instructions, data, computer programs, software, code, routines, etc., to the primary site 104 and may comprise at least a portion of a client-server model. In general, the primary site 104 can be accessed by the client device(s) 25 and/or communication with the primary site 104 can be initiated by the client device(s) 25 through a network socket (not shown) utilizing one or more inter-process networking techniques.

At least in the illustrated embodiment, the primary site 104 includes, among other components, a set of storage devices 202, a set of computing devices 204, and a set of storage engines 206 coupled to and/or in communication with one another. The storage devices 202 (also simply referred individually, in various groups, or collectively as storage device(s) 202) may be any suitable type of device and/or system that is known or developed in the future that can store computer-useable data. In various embodiments, a storage device 202 may include one or more non-transitory computer-usable mediums (e.g., readable, writable, etc.), which may include any non-transitory and/or persistent apparatus or device that can contain, store, communicate, propagate, and/or transport instructions, data, computer programs, software, code, routines, etc., for processing by or in connection with a computer processing device.

In some embodiments, a storage device 202 may be implemented as a direct-access storage device (DASD). A storage device 202, in further embodiments, may include other types of non-transitory memory such as, for example, flash memory (e.g., a solid-state devices (SSD) or other non-volatile storage devices that store persistent data), a dynamic random access memory (DRAM) device, an enhanced dynamic random access memory (EDRAM) device, a static random access memory (SRAM) device, a hard disk drive (HDD), a near-line drive, tape drive (e.g., magnetic and/or virtual), and/or other type(s) (e.g., non-volatile and/or persistent) of memory devices, etc. that are possible and contemplated herein.

A set of computing devices 204 (also simply referred individually, in various groups, or collectively as computing device(s) 204) may include any type of hardware and/or software that is known or developed in the future that can perform computing operations. In various embodiments, the computing device(s) 204 can perform I/O operations related to one or more suitable services and/or applications, which can be any service and/or application that is known or developed in the future.

A set of storage engines 206 (also simply referred individually, in various groups, or collectively as storage engine(s) 206) may include non-volatile/persistent hardware and/or software configured to perform and/or facilitate long-term data storage operations on the storage devices 202, including, but not limited to, data archiving, data backup, data mirroring, replicating data, etc. For instance, a storage engine 206 may include non-volatile and/or persistent hardware and/or software to perform long-term data storage operations on the storage devices 202, which may include write operations, read operations, read-write operations, etc., among other operations that are possible and contemplated herein. In various embodiments, a storage engine 206 may communicate with the backup site 106 and/or a storage engine 306 in the backup site 106 to mirror, copy, and/or recover data between the primary site 104 and the backup site 106, as discussed elsewhere herein.

In various embodiments, a storage engine 206 may include any type of hardware and/or software that is known or developed in the future that can receive I/O requests (e.g., write request, read request, and/or read-write request, etc.) from the client device(s) 25 and perform corresponding I/O operations (e.g., write operations, read operations, and/or read-write operations, etc.) on the set of storage devices 202 in response thereto. A storage engine 206 may further include hardware and/or software for executing instructions in one or more applications to manage storage operations on the primary site 104 and/or the functionality of the set of storage devices 202. In some embodiments, one or more computing devices 206 may include a bare-metal/bare machine (BM) and/or one or more computing devices 206 may include a virtual machine (VM).

In various embodiments, the storage engine (s) 206 can establish an initial replication relationship with the backup site 106 utilizing an initial replication mode. The initial replication mode can indicate that one or more storage volumes in the storage device(s) 202 and corresponding storage volumes on the backup site 106 do not store common data and/or the same data set.

The storage engine (s) 206 may further include hardware and/or software to generate first storage snapshots of the data, sets of data, subsets of data, etc. stored in the storage device(s) 202 and transmit the first storage snapshots to the backup site 106 so that the data stored on the primary site 104 is mirrored/copied to the backup site 106. The first storage snapshots may be generated using any snapshot technology and/or technique that is known or developed in the future.

In various embodiments, the first storage snapshots are generated in and/or include a first format, which may be any snapshot format that is known or developed in the future. In some embodiments, the first storage snapshots are generated using and/or include a snapshot format based on a Type A hypervisor, which can also be referred to as a "native" hypervisor, "bare-metal" hypervisor, and/or "embedded" hypervisor.

The storage engine(s) 206, in various embodiments, can manage a set of recent first storage snapshots that can be stored in the storage device(s) 202 and/or elsewhere on the primary site 104. For instance, the storage engine(s) 206 can add and/or delete recent first storage snapshots to ensure that the set of recent first storage snapshots is an accurate reference marker/copy of the data currently stored in the storage device(s) 202. In some embodiments, the set of recent first storage snapshots stored on the primary site 104 includes a predetermined quantity of recent first storage snapshots.

The set of recent first storage snapshots can include any suitable quantity that facilitates data replication on the backup site 106. Further, one or more recent first storage snapshots can be added to/deleted from the set of recent first storage snapshots to maintain the predetermined quantity and/or maintain a range of recent first storage snapshots.

Recent first storage snapshots may be added to the set of recent first storage snapshots in response to one or more predetermined events, which may include, for example, expiration of a predetermined amount of time, a predetermined number of I/O operations performed on one or more storage devices 202, and/or a predetermined number of write operations performed on one or more storage devices 202, etc., among other events that are possible and contemplated herein. Similarly, recent first storage snapshots may be deleted from the set of recent first storage snapshots in response to one or more predetermined events, which may include, for example, expiration of a predetermined amount of time, a predetermined number of I/O operations performed on one or more storage devices 202, a predetermined number of write operations performed on one or more storage devices 202, generation and/or storage of a predetermined number of recent first storage snapshots, a location storing the set of recent first storage snapshots becoming full, substantially full, and/or storing greater than a threshold quantity of recent first storage snapshots, etc., among other events that are possible and contemplated herein.

In some embodiments, the storage engine(s) 206 transmit to the backup site 106 indications of the recent first storage snapshot(s) that is/are currently being stored on the primary site 104. The storage engine(s) 206 may periodically transmit the indications to the backup site 106, which can be at any suitable interval(s) of time that can inform the backup site 106 of the recent storage snapshots that are currently stored on the primary site 104 and/or allow the backup site 106 to know the data that is currently being stored in the storage device(s) 204 within a threshold margin of time. The interval(s) may be regular intervals and/or random intervals provided that the backup site 106 is not out of synch with the primary site 104 by more than the threshold amount of time, which can be any suitable amount of time and/or an amount of time that does not create undue delay in recovering the data on the primary site 104 in the unlikely event that the primary site 104 becomes at least temporarily unavailable.

The storage engine(s) 206, in various embodiments, can convert one or more first storage snapshots from the first snapshot format to a second snapshot format (e.g., a Type B hypervisor format) that is different than the Type A hypervisor format to generate one or more storage snapshots, which can be referred to herein as fifth storage snapshot(s). The second snapshot format, in some embodiments, may be the same snapshot format used by the backup site 106 to generate, store, and/or modify storage snapshots therein. A first storage snapshot that is selected for conversion and/or for providing the basis for generating a fifth storage snapshot may be selected based on its correspondence to a second storage snapshot that is selected for generating a third storage snapshot based thereon, as discussed elsewhere herein. For instance, a selected first storage snapshot may represent the most recent point of operation of the primary site 104.

The storage engine(s) 206 can receive one or more incremental changes/modifications to the data from the backup site 106, which changes/modifications occurred while the primary site 104 was offline/unavailable and can be referred to as the delta between the third storage snapshot(s) and the fourth storage snapshot(s), as discussed elsewhere herein. Further, the storage engine(s) 206, in various embodiments, can modify the fifth storage snapshot(s) with the incremental change(s)/delta to generate one or more sixth storage snapshots including the second snapshot format, which can be the same as the fourth storage snapshots discussed elsewhere herein.

In various embodiments, the storage engine(s) 206 can convert the sixth storage snapshot(s) from the second snapshot format to the first snapshot format to generate seventh storage snapshots. Generating the seventh storage snapshot(s) may occur during failback operations and/or may initiate a return of the primary site 104 to being online/available, which can be referred to as standard or normal operations.

Figure 3:
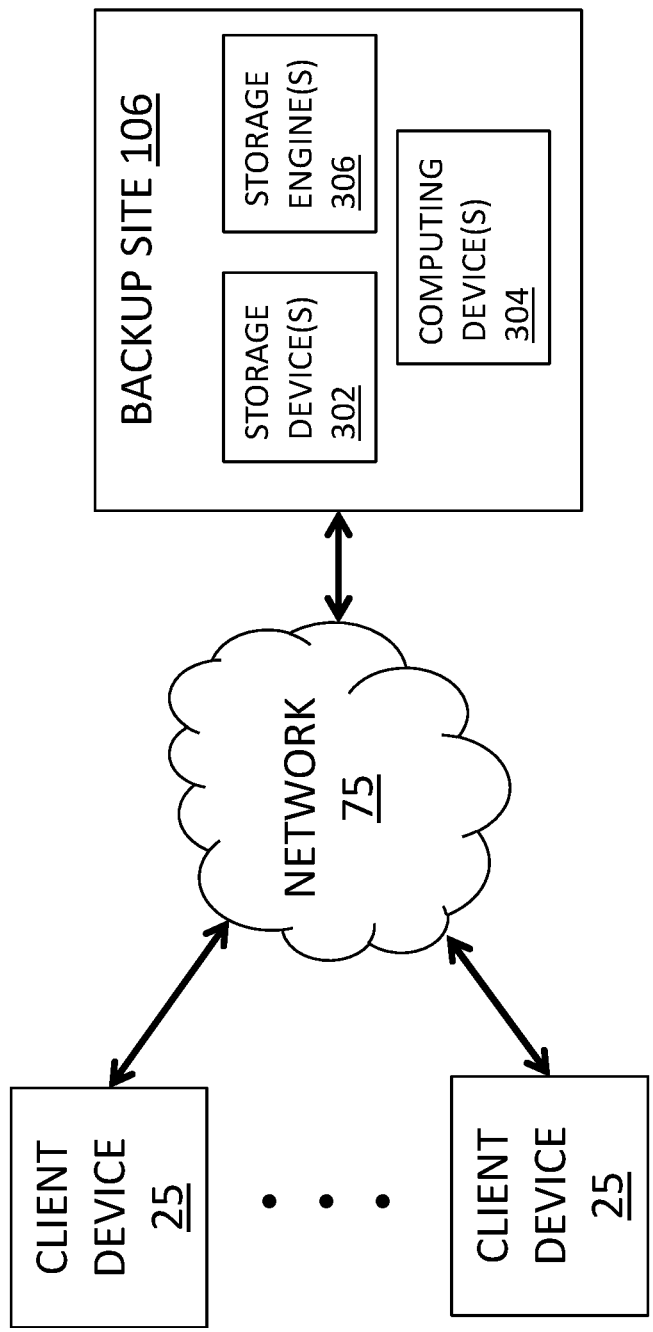
FIG. 3 is a block diagram of an embodiment of a backup site included in the storage systems of FIGS. 1A-1C.

With reference to FIG. 3, FIG. 3 is a block diagram of one embodiment of a backup site 106 (or DR site/system) included in the storage system/network 100. As shown, the backup site 106 can be coupled to and/or in communication with the set of client devices 25 via the network 75, although other embodiments contemplate that the backup site 106 may be coupled to and/or in communication with the client device(s) 25 via the primary site 104. Each client device 25, as part of its respective operation, can further rely on sending I/O requests to the backup site 106 to write data, read data, and/or modify data in the backup site 106 similar to the I/O requests directed to the primary site 104, as discussed elsewhere herein.

At least in the illustrated embodiment, the backup site 106 includes, among other components, a set of storage devices 302 and a set of computing devices 304 coupled to and/or in communication with one another similar to the storage device(s) 202 and the computing device(s) 204 in the primary site 104 discussed herein with reference to FIG. 2. The backup site 106 further includes a set of storage engines 306 (also simply referred individually, in various groups, or collectively as storage engine(s) 306) that may include any type of hardware and/or software that is known or developed in the future that can perform replication operations for the primary site 106 and/or receive I/O requests (e.g., write request, read request, and/or read-write request, etc.) from the client device(s) 25 and perform corresponding replication and/or I/O operations (e.g., write operations, read operations, and/or read-write operations, etc.) on the storage device(s) 302.

A storage engine 306 may include hardware and/or software for executing instructions in one or more applications to manage the backup site 106 and/or the functionality of the set of storage devices 302. In some embodiments, one or more storage engines 306 may include a BM and/or one or more storage engines 306 may include a VM.

In various embodiments, the storage engine(s) 306 may include hardware and/or software to receive the first storage snapshot(s) from the primary site 104, which is/are a copy of the first storage snapshot(s) and can be referred to as second storage snapshot(s) including the first snapshot format so that the data stored on the primary site 104 is mirrored/copied to the backup site 106 (e.g., the storage device(s) 302). The storage engine(s) 306 may store/write the second storage snapshots to the storage device(s) 302 and/or at one or more suitable other storage locations on the backup site 106. Further, the storage engine(s) 306 can manage the quantity of stored second storage snapshots by adding and/or deleting second storage snapshots to maintain a predetermined quantity and/or range of second storage snapshots on the backup site 106.

In some embodiments, a second storage snapshot may be added to and/or stored in the backup site 106 as first storage snapshots are received from the primary site 104. In additional or alternative embodiments, a second storage snapshot may be deleted and/or retired from the backup site 106 in response to a predetermined event. Examples of a predetermined event include, but are not limited to, expiration of a predetermined amount of time, generation and/or storage of a predetermined number of second storage snapshots, a location storing the second storage snapshots becoming full, substantially full, and/or storing greater than a threshold quantity of second storage snapshots, etc., among other events that are possible and contemplated herein.

Further, the storage engine(s) 306 can convert one or more second storage snapshots from the first snapshot format to the second snapshot format to generate one or more third storage snapshots including the second storage snapshot format, which can be the same as the fifth storage snapshot(s) discussed elsewhere herein. For instance, a second storage snapshot may be selected based on its correspondence to a first storage snapshot that represents the most recent point of operation of the primary site 104 before the primary site 104 went offline or otherwise became unavailable.

In various embodiments, a third storage snapshot may be generated in response to detection of the primary site 104 going offline or otherwise becoming unavailable. Further, the third storage snapshot(s) include the same or substantially the same data as the first and second storage snapshots in a different snapshot format and the generation of such may be considered a starting point for DR operations.

In various embodiments, the storage engine(s) 306 can modify the third storage snapshots during the period of time in which the primary site 104 is offline/unavailable to generate fourth storage snapshots including the second snapshot format. Further, the data in the fourth storage snapshots may be created based on the most recent point of operation of the backup site 106.

In some embodiments, the fourth storage snapshots can represent a copy of the third storage snapshots with the addition of various modifications and/or new data from write operations performed on earlier fourth storage snapshots. For instance, the fourth storage snapshots may be representations of the data resulting from one or more write operations performed on earlier fourth storage snapshots and/or may include the incremental changes to the third storage snapshots resulting from the write operation(s).

In various embodiments, the storage engine(s) 306 can convert the fourth storage snapshot(s) from the second snapshot format to the first snapshot format to generate eighth storage snapshots, which are the same as the seventh storage snapshot(s) on the primary site 104. Generating the eighth storage snapshot(s) can allow a replication relationship to be restarted and/or replication to continue without copying data between the primary site 104 and the backup site 106 when the primary site 104 is again online/available. In other words, the data stored on the primary site 104 and the backup site 106 can be synchronized/resynchronized prior to the primary site 104 returning to operating in a standard or normal mode.

In various embodiments, the various resources and/or components of the backup site 106 may be reserved for use in disaster recovery operations. Further, the various resources and/or components of the backup site 106 may or may not be allocated for use in disaster recovery operations at any given point in time. For instance, the various resources and components of the backup site 106 may be reserved and allocated for use in disaster recovery operations in response to an unlikely disaster, and/or the primary site becoming otherwise unavailable and may be reserved and unallocated while the primary site 104 is functioning properly and/or is available.

Figure 4:
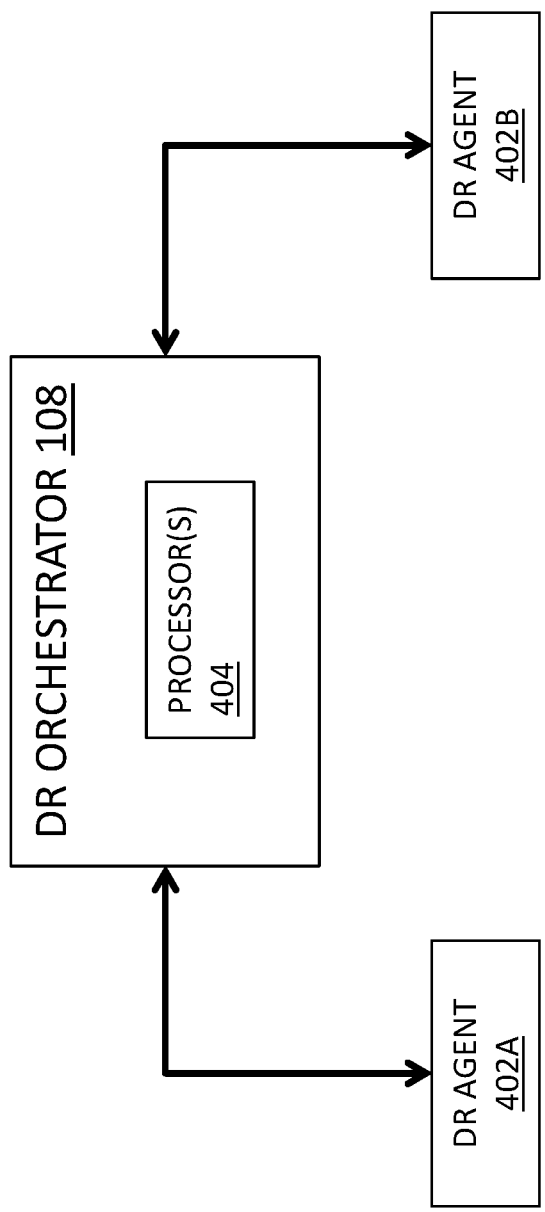
FIG. 4 is a diagram of one embodiment of a data recovery (DR) orchestrator included in the storage systems of FIGS. 1A-1C.

Referring now to FIG. 4, FIG. 4 is a diagram of one embodiment of a DR orchestrator 108 that can integrate resources and/or manage the exchange of data (e.g., copying/mirroring of data) to, from, and/or between the primary site 104 and the backup site 106 (e.g., backup site 106), especially in the unlikely event that the primary site 104 becomes temporarily unavailable (e.g., power failure, goes offline, etc.). At least in the illustrated embodiment, a DR orchestrator 108 may include a data recovery agent (DRA) 402A coupled to, included in, and/or otherwise in communication with the primary site 104, a DRA 402B on the coupled to, included in, and/or otherwise in communication with the backup site 106, and a processor 404 coupled to and/or in communication with one another.

The DRAs 402A and 402B (also simply referred individually, in various groups, or collectively as DRA(s) 402) can include any hardware and/or software that can manage the exchange of storage snapshots between the primary site 104 and the backup site 106. Further, the DRAs 402 can manage input/output (I/O) requests from a set of client devices 25 (see FIG. 2 and/or FIG. 3) to the primary site 104 and/or to the backup site 106. In some embodiments, the DRAs 402 may be dormant and/or inactive when the primary site 104 and/or the backup site 106 is/are functioning properly and can become active in response to detection of one or more predetermined events (e.g., power failure, goes offline, or otherwise becomes unavailable, etc.) on the primary site 104 and/or the backup site 106.

For instance, a DRA 402 may include any type of hardware and/or software that is known or developed in the future that can facilitate communications, data mirroring, and/or data recovery between the primary site 104 and the backup site 106. In various embodiments, the DRA 402 may use snapshot technology to take a sector level backup of data stored in the set of storage devices 202.

Referring now to FIG. 5A, FIG. 5A is a block diagram of one embodiment of a processor 404A that can be included in a DR orchestrator 108. At least in the illustrated embodiment, a processor 404A may include, among other components, a synchronization module 502 and a failback module 504 coupled to and/or in communication with one another.

A resynchronization module 502 can establish a replication relationship between the primary site 104 and the backup site 106 in a replication mode, which can be referred to herein as a second replication relationship and a second replication mode, respectively. The second replication mode can indicate that corresponding storage volumes on the primary site 104 and the backup site 106 store data that is initially the same except for/apart from changes/modifications made to the mirrored data on the backup site 106. For instance, the second replication mode can indicate that the mirrored data on the backup site 106 includes changes/modifications that occurred during a period of time when the primary site 104 was unavailable and/or that corresponding volumes on the primary site 104 and the backup site 106 store substantially the same data and/or substantially similar data, with the difference being the changes/modifications.

In various embodiments, a resynchronization module 502 may include hardware and/or software that can convert one or more first storage snapshots to the snapshot format utilized on the backup site 106 (e.g., Type B hypervisor) to generate one or more fifth storage snapshots in the second snapshot format. A resynchronization module 502 may further include hardware and/or software that can receive the incremental changes/updates represented in the fourth storage snapshot(s) and/or the fourth storage snapshot(s) from the backup site 106.

The resynchronization module 502 can further generate one or more sixth storage snapshots in the second snapshot format on the primary site 104. For instance, a sixth storage snapshot may be generated by synchronizing and/or resynchronizing the incremental changes/updates and the fifth storage snapshot(s).

In some embodiments, a resynchronization module 502 can generate one or more seventh storage snapshots in the first snapshot format on the primary site 104. For instance, a seventh storage snapshot may be generated by converting the sixth storage snapshot(s) from second snapshot format to the first snapshot format.

The third snapshots are converted from the second snapshots, which are replicated from the first snapshots so the data in the third snapshots is present on both sites and may not be transmitted between the sites. Data in the fourth snapshots is new data generated during DR operations so the data in the fourth snapshots is incremental changes that are transmitted from the backup site 106 to the primary site 104.

A failback module 504 can include hardware and/or software that can perform failback operations. In some embodiments, a failback module 504 can pause and/or stop the transmission of third storage snapshots from the backup site 106 to the primary site 104. For instance, a failback module 504 can, at least temporarily, direct and/or instruct the backup site 106 to cease generating third and fourth storage snapshots and/or modifying fourth storage snapshots.

In various embodiments, a failback module 504 can initiate the spin-down of at least a subset of the resources on the backup site 106 subsequent to data synchronization/resynchronization. For instance, one or more resources on the backup site 106 can be released from DR operations and/or placed in reserve for future DR operations. That is, various resources on the backup site 106 may return to being reserved for future DR operations and not allocated for use until a DR triggering event is detected.

A failback module 504, in further embodiments, can generate one or more eighth storage snapshots including the first snapshot format. An eighth storage snapshot may be generated by converting the fourth storage snapshot(s) on the backup site 106 from the second snapshot format to the first snapshot format. Notably, the eight storage snapshot(s) on the backup site 106 and the seventh storage snapshot(s) on the primary site 104 are the same or substantially similar storage snapshots and include the same snapshot format.

In various embodiments, a failback module 504 can establish a replication relationship between the primary site 104 and the backup site 106 in a mode that indicates that corresponding storage volumes on the primary site 104 and the backup site 106 store the same data and/or do not need initial resynchronization, which can be referred to as a third replication relationship and third replication mode, respectively.

In additional or alternative embodiments, the failback module 504 can initiate and/or facilitate the primary site 104 returning to normal operations. For instance, a failback module 504 can direct and/or command the primary site 104 to resume I/O operations directed to the data set stored on the primary site 104 (e.g., storage device(s) 202) in response to the data being synchronized/resynchronized on the primary site 104 and the backup site 106. In other words, I/O operations from the client device(s) 25 may be directed to and/or again resumed on the primary site 104 following data synchronization/resynchronization. In this manner, a replication relationship between the primary site 104 and the backup site 106 can be resumed without bulk data transfer between the two sites.

Figure 5B:
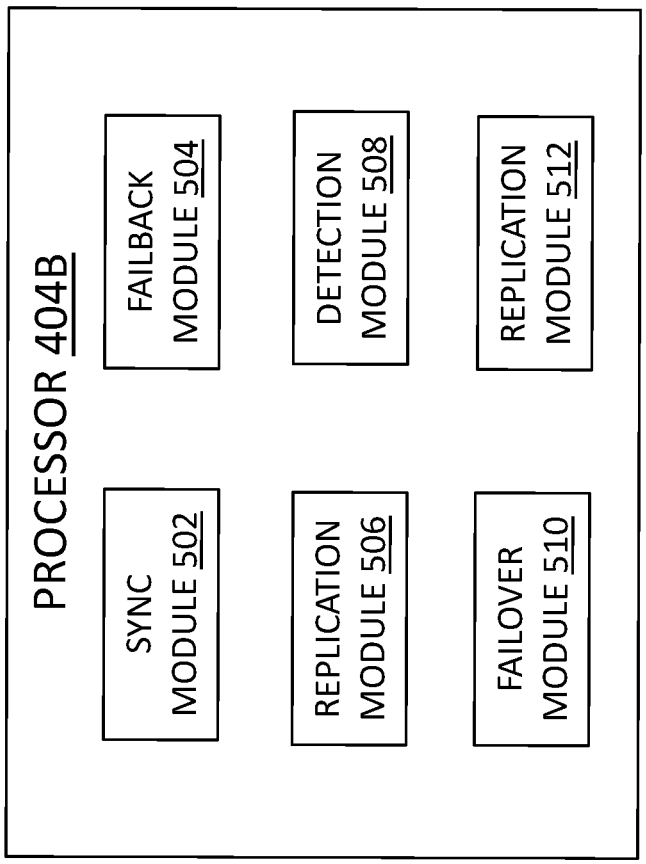

With reference to FIG. 5B, FIG. 5B is a block diagram of another embodiment of a processor 404B that can be included in a DR orchestrator 108. A processor 404B may include synchronization module 502 and a failback module 504 coupled to and/or in communication with one another similar to the processor 404A discussed with reference to FIG. 5A. At least in the illustrated embodiment, a processor 404B may further include, among other components, a replication module 506, a detection module 508, a failover module 510, and a replication module 512, coupled to and/or in communication with one another and with the synchronization module 502 and the failback module 504.

A replication module 506 may include hardware and/or software that can receive one or more first storage snapshots from the primary site 104 and/or facilitate transfer of the first storage snapshot(s) from the primary site 104 to the backup site 106, which can create one or more corresponding second storage snapshots on the backup site. The first and second storage snapshots may include any type of storage snapshot and/or snapshot format that is known or developed in the future, as discussed elsewhere herein.

In some embodiments, a replication module 506 can transmit indications of recent first storage snapshots to the backup site 106. The replication module 506, in one embodiment, transmits the indications about every ten (10) seconds, which can ensure that the backup site 106 is not out of synch with the primary site 104 by more than about ten (10) seconds regarding the data and/or recent first storage snapshot(s) that is/are being stored on the primary site 104, among other time interval examples that may be greater than or less than about ten (10) seconds. In additional or alternative embodiments, the replication module 506 can transmit the indications in response to one or more predetermined events, which may be any suitable predetermined event that keeps the backup site 106 informed and/or updated regarding the recent first storage snapshots and/or data is/or stored on the primary site 104, as discussed elsewhere herein.

A detection module 508 may include hardware and/or software that can detect an availability of the primary site 104. For instance, a detection module 508 can detect when the primary site 104 is functioning properly and/or goes offline or otherwise becomes unavailable.

In various embodiments, a failover module 510 may include hardware and/or software that can convert and/or facilitate conversion of the second storage snapshot(s) to third storage snapshot(s) in a second snapshot format, which may include any type of snapshot format that is known or developed in the future, as discussed elsewhere herein. Further, a second storage snapshot may be selected for conversion based on its correspondence to a first storage snapshot that represents the most recent point of operation of the primary site 104 before the primary site 104 went offline or otherwise became unavailable, as discussed elsewhere herein.

For instance, a failover module 510, in some embodiments, can receive notifications and/or indications of the recent first storage snapshots that are being stored on the primary site 104, which may be received at any interval(s) that allows the backup site 106 to be informed of the current set and/or semi-current set of recent first storage snapshots being stored on the primary site 104. Further, the third storage snapshots, in some embodiments, may be generated based on one or more of the recent first storage snapshots included in a recently received and/or the most recently received notification/indication. In one embodiment, a recent first storage snapshot corresponding to a selected second storage snapshot for conversion may be the most recent first storage snapshot that is expected to become available after the primary site 104 returns online, which can be the actual most recent first storage snapshot or an older first storage snapshot that will be available when the primary site 104 returns online and/or becomes available if a newer first storage snapshot will not be available when the primary site 104 returns online and/or becomes available.

In additional or alternative embodiments, a failover module 510 can generate the third storage snapshot(s) in response to the detection module 508 detecting that the primary site 104 is or has become offline/unavailable. A failover module 510, in some embodiments, can modify the third storage snapshot(s) in response to input/output (I/O) operations directed to the data on the backup site 106 during a period of unavailability of the primary site 104 to generate one or more fourth storage snapshots in the second snapshot format. In further embodiments, the fourth storage snapshots can represent the incremental modifications and/or writes performed on the data during a period of time in which the primary site 104 was unavailable/offline and may include new and/or different data than the first and second storage snapshots.

For instance, the failover module 510 can modify data in and/or write data to the third storage snapshots when the primary site 104 is offline/unavailable. As such, the fourth storage snapshots can include the data of the first and second storage snapshots with data modifications/writes, new data, and/or additional data in a different snapshot format.

In response to the primary site 104 becoming available and/or returning online after a period of unavailability, the failover module 510 can establish a replication relationship with the primary site 104 utilizing and/or including a replication mode that indicates that the fourth storage snapshots and the data stored in corresponding storage volumes on the primary site 104 are the same data apart from any modifications made to the third storage snapshots during the period of unavailability, which can be referred to as a second replication relationship and a second replication mode, respectively. In this manner, the failover module 510 can transmit any incremental modifications or updates and/or the fourth storage snapshots to the primary site 104 after the primary site 104 returns online or otherwise becomes available.

A replication module 512 can include hardware and/or software that generates, transmits, and/or facilitates the transmission of the first storage snapshot(s) from the primary site 104 to the backup site 106 so that the data stored on the primary site 104 is copied to and/or stored on the backup site 106. As discussed elsewhere herein, the first storage snapshot(s) may include and/or be generated utilizing any snapshot format that is known or developed in the future.

The replication module 512, in various embodiments, can establish and/or facilitate establishing an initial replication relationship with the backup site 106 utilizing an initial replication mode. The initial replication mode can indicate that one or more storage volumes on the primary site 104 (e.g., in the storage device(s) 202, etc.) and corresponding storage volumes on the backup site 106 do not store common data and/or the same data set.

In FIG. 1B, a storage system 100B may be similar to the storage system 100A, except that the DR orchestrator 108 is included on and/or forms a portion of the primary site 104. In FIG. 1C, a storage system 100C may be similar to the storage systems 100A and/or 100B, except that the DR orchestrator 108 is included on and/or forms a portion of the backup site 106.

Figure 6A:
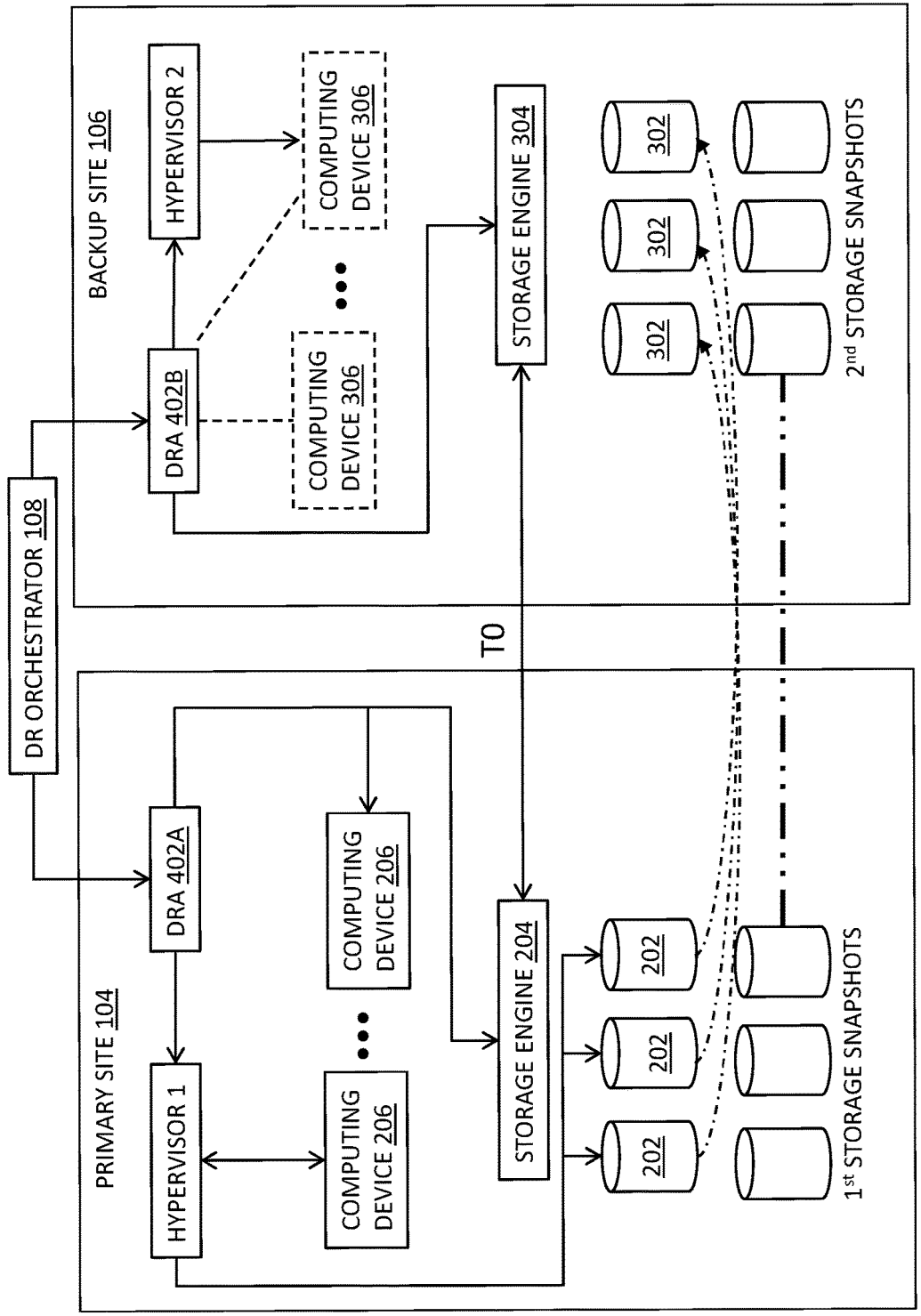
FIGS. 6A-6D are timing diagrams for various operations of the storage systems of FIGS. 1A-1C.

Referring to FIG. 6A, FIG. 6A is a timing diagram illustrating standard operations of a storage system 100. At a time T0, an initial replication relationship in an initial mode may be established between the primary site 104 and the backup site 106 and data is copied from the primary site 104 to the backup site 106 (e.g., data replication operations). The data may be replicated and/or copied using the first storage snapshots and second storage snapshots, as discussed elsewhere herein. For instance, a data replication process can create consistent groups of point-in-time snapshots of storage volumes in, for example, the storage device(s) 202 such that there can always be a recent set of available recent storage snapshots on the backup site 106 (e.g., a DR site) that is known by the backup site 106 to also be available on the primary site 104.

As further discussed elsewhere herein, various computing, system, and/or network resources that are reserved and not allocated for use in DR operations are available on the backup site 106, which is shown by at least some of the resources on the backup site 106 being represented by dashed lines. Having the various computing, system, and/or network resources reserved and not allocated until used for DR operations can reduce system/network costs and/or conserve resources on the backup site 106.

Figure 6B:
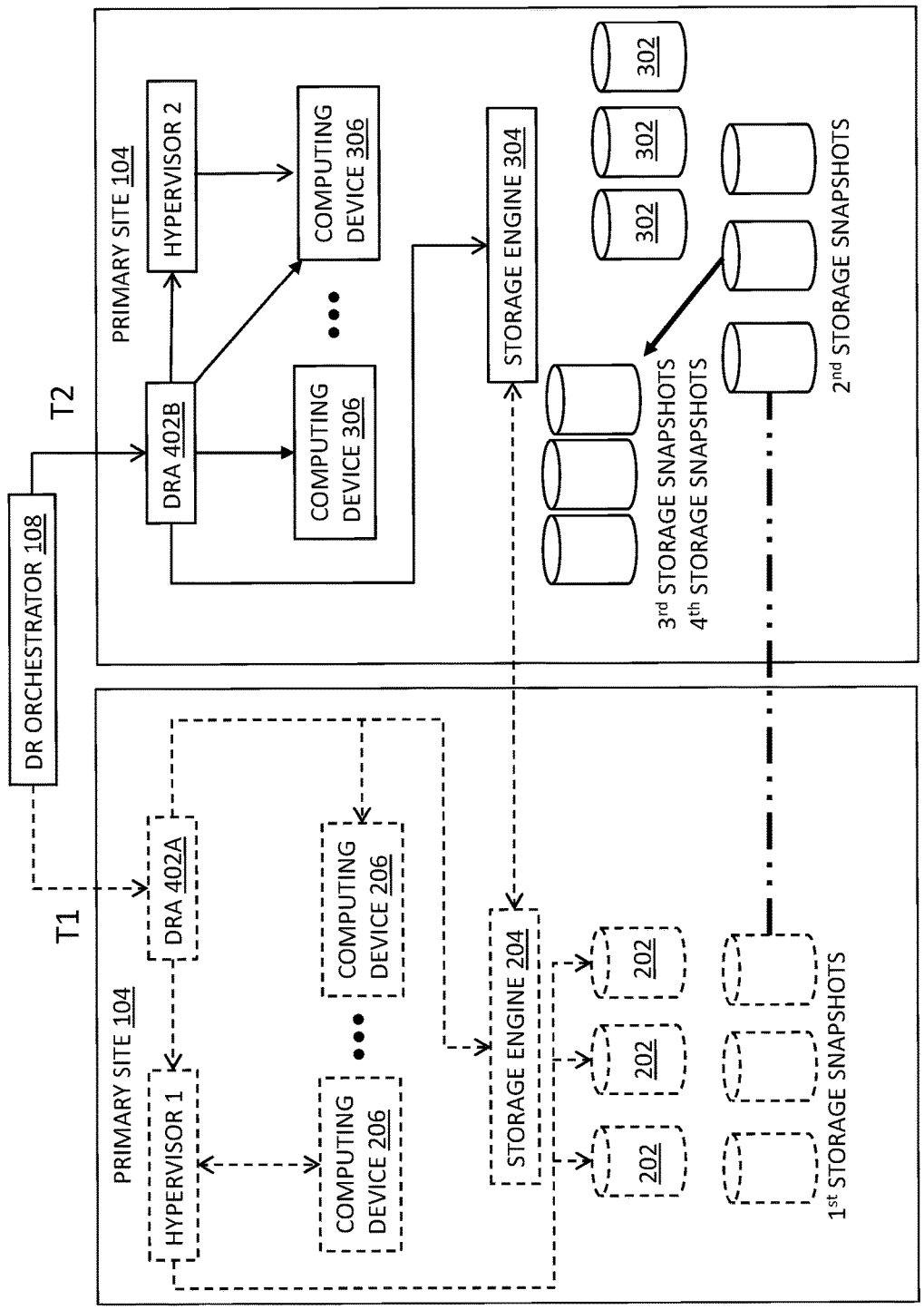

FIG. 6B is a timing diagram illustrating DR operations of the storage system 100. At time T1, a DR orchestrator 108 can detect that the primary site 104 has gone offline and/or is otherwise unavailable, which is shown by the resources on the primary site 104 being represented by dash lines. In response thereto, the DR orchestrator 108 can begin managing failover operations from the primary site 104 to the backup site 106 at time T2.

The failover operations can include allocating the reserved resources on the backup site 106. Further, the DR orchestrator 108 can begin converting one or more second storage snapshots from the first snapshot format to the second snapshot format to create/generate one or more third storage snapshot(s) on the backup site 106, as discussed elsewhere herein. The third storage snapshot(s) is/are preferably created from the second storage snapshot(s) that correspond(s) to the most recent first storage snapshot(s), although one or more second storage snapshots corresponding to one or more older first storage snapshots may be utilized.

In some embodiments, the failover operations can include mounting one or more storage volumes, disks, and/or devices, etc. with a suitable driver that can access a list of available storage volumes, disks, and/or devices, etc. on the backup site 106. Further, the third storage snapshot(s) may be based on one or more second storage snapshots stored in the mounted storage volumes, disks, and/or devices. Failover operations may further include creating one or more change/modification storage volumes, disks, and/or devices, etc. that hold/store one or more fourth storage snapshots that include/represent any changes and/or modifications made to the data that is mirrored on the backup site 106.

Figure 6C:
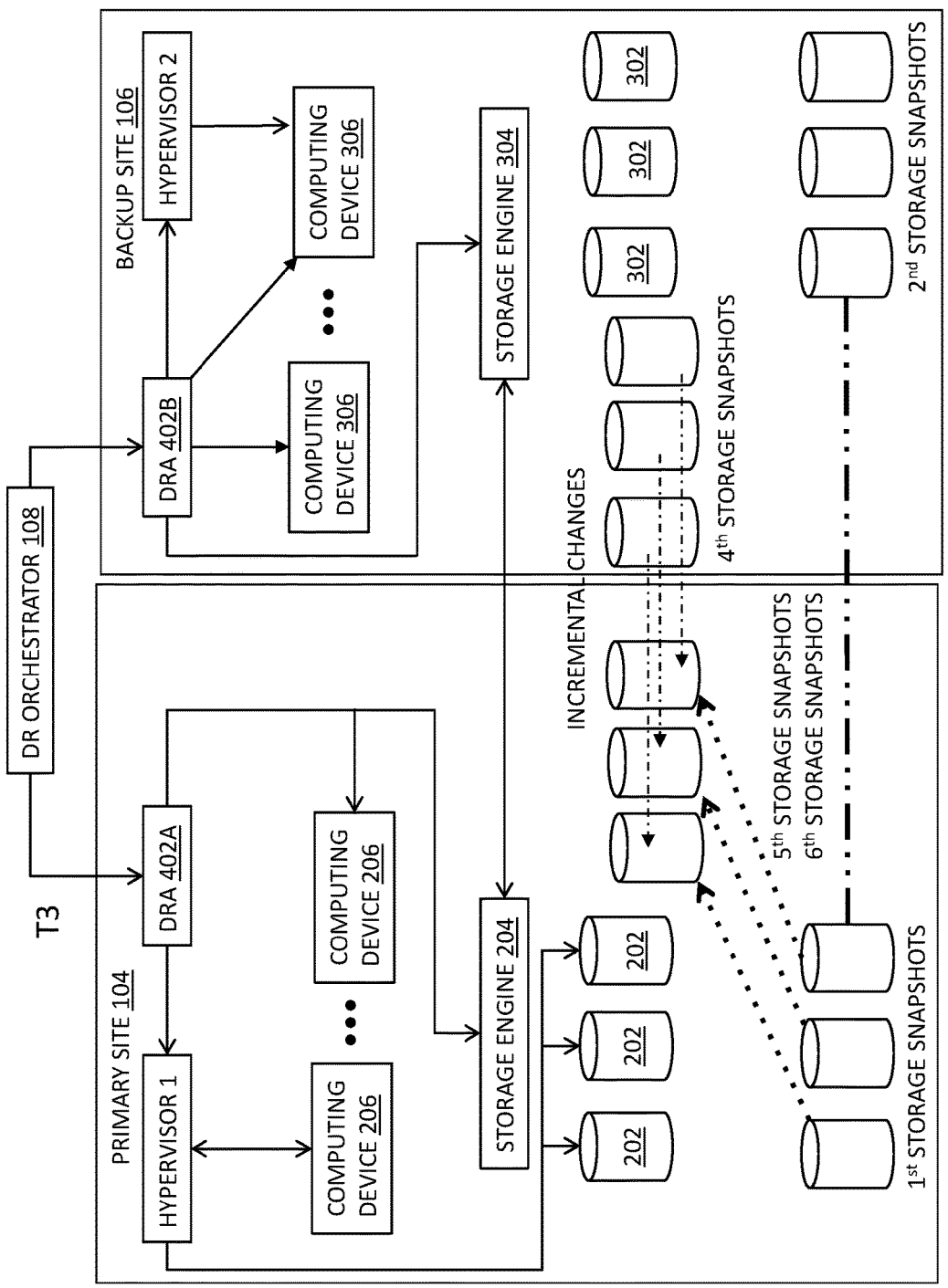

With reference to FIG. 6C, a timing diagram illustrating synchronization and/or resynchronization operations is provided. At time T3, the DR orchestrator 108 can determine that the primary site 104 is online/available and can initiate the synchronization and/or resynchronization operations in preparation for failback operations, as discussed with reference to FIG. 6D.

In various embodiments, one or more fifth storage snapshots may be generated on the primary site 104. To generate the fifth storage snapshot(s), the first snapshot format in one or more first storage snapshots may be converted to the second snapshot format. The first storage snapshot(s) may be selected based on the first storage snapshot(s) that represent(s) the most recent operations on the primary site 104.

In some embodiments, a second replication relationship in a second replication mode may also be established between the primary site 104 and the backup site 106. In one embodiment, the second replication relationship in the second replication mode may indicate that the corresponding storage volumes on the primary site 104 and the backup site 106 include the same data apart from any modifications performed on and/or included in the data on the backup site 106 resulting from I/O operations during the period in which the primary site 104 was offline/unavailable.

Figure 6D:
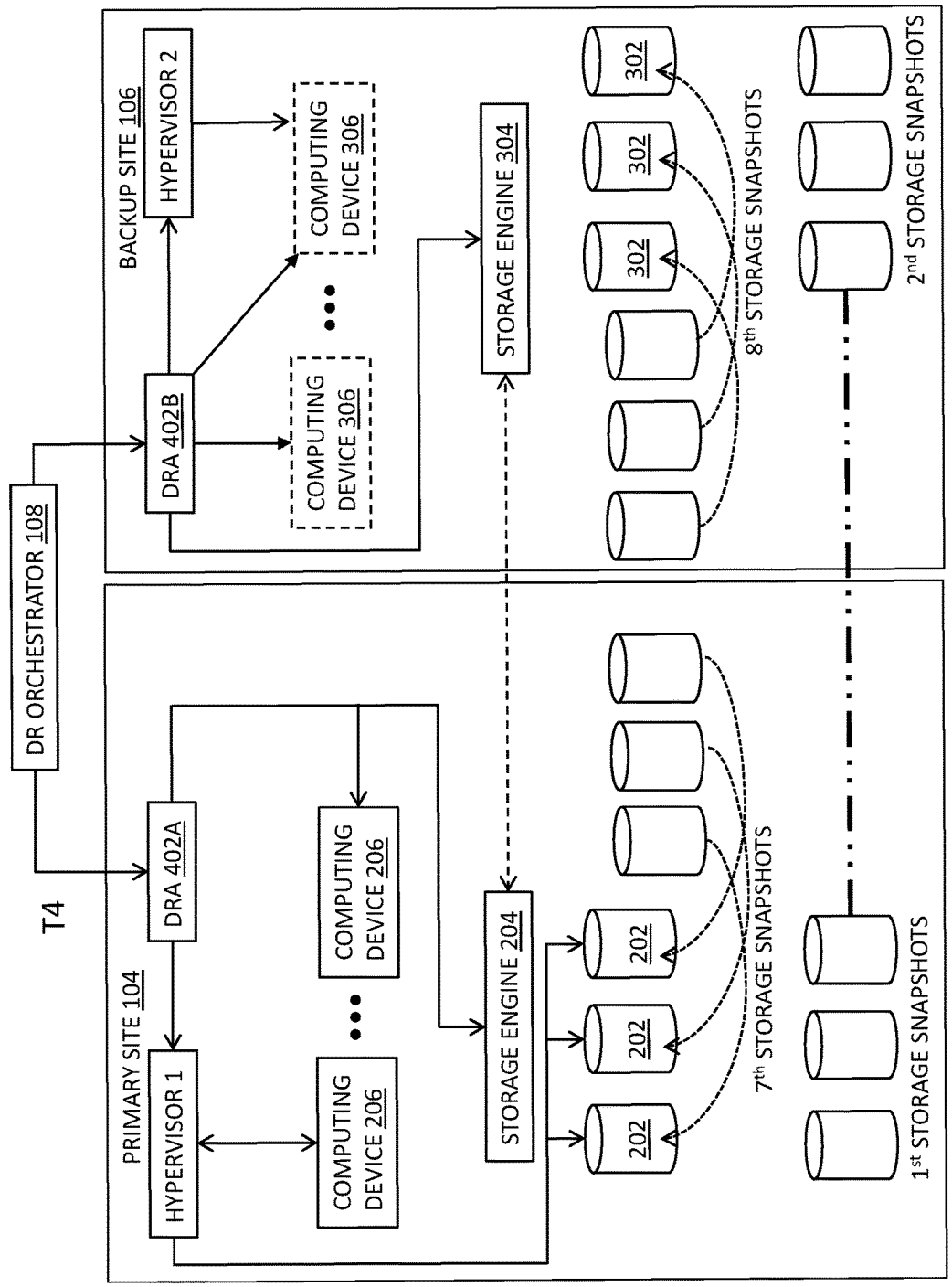

The synchronization and/or resynchronization operations may further include receiving the incremental changes/updates in the fourth storage snapshots and/or the fourth storage snapshot(s) from the backup site 106. The incremental changes/updates may be combined and/or synchronized with the fifth storage snapshot(s) to generate one or more sixth storage snapshots including the second snapshot format. Failback operations may be initiated in response to the synchronization and/or resynchronization operations be completed. As shown in FIG. 6D, I/O operations performed on the backup site 106 may be paused and/or stopped for a predetermined amount of time and the resources on the backup site 106 can be spun-down and returned to a status in which the resource(s) are reserved and not allocated at time T4.

The DR orchestrator 108 can convert the second snapshot format of the sixth storage snapshots to the first snapshot format to generate one or more seventh storage snapshots including the first snapshot format. Further, the DR orchestrator 108 can perform and/or facilitate conversion of the second snapshot format in the fourth storage snapshots to the first snapshot format to generate one or more eighth storage snapshots so that the data on both sites match. That is, the eighth storage snapshot(s) on the backup site 106 and the seventh storage snapshot(s) on the primary site 104 include the same snapshot format (e.g., the first snapshot format) and the same data (e.g., the data, as modified, on the backup site 106 during the offline/unavailable period of time of the primary site 104).

In some embodiments, a third replication relationship in a third replication mode may be established between the primary site 104 and the backup site 106. In one embodiment, the third replication relationship in the third replication mode may indicate that the corresponding storage volumes on the primary site 104 and the backup site 106 include the same data. The storage system 100 may then return to it standard or normal operations, as represented at time T0 in FIG. 6A.

Figure 7:
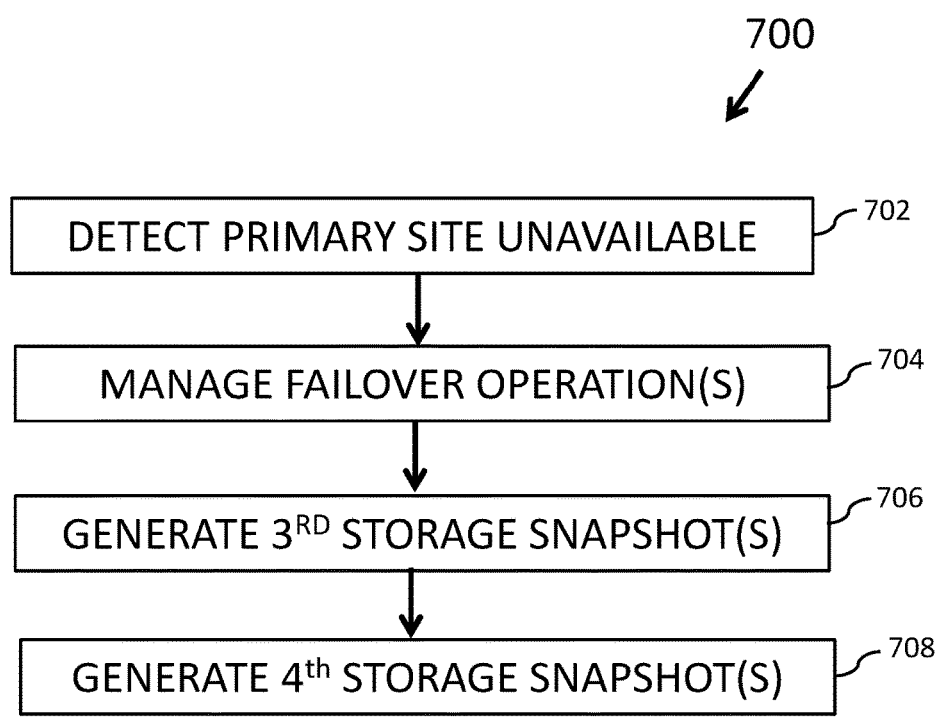
FIG. 7 is a schematic flow chart diagram illustrating one embodiment of a method for performing DR operations on the storage systems of FIGS. 1A-1C.

Referring now to FIG. 7, FIG. 7 is a schematic flow chart diagram illustrating one embodiment of a method 700 for performing DR operations on a storage system 100. At least in the illustrated embodiment, a DR orchestrator 108 can detect that the primary site 104 has gone offline and/or is otherwise unavailable (block 702).

In response thereto, the DR orchestrator 108 can begin managing failover operations from the primary site 104 to the backup site 106 (block 704). The failover operations can include allocating reserved resources on the backup site 106, as discussed elsewhere herein.

The DR orchestrator 108 can begin generating one or more third storage snapshot(s) based on one or more second storage snapshots (block 706). The third storage snapshot(s) can be generated by converting one or more second storage snapshots from the first snapshot format to the second snapshot format. A second storage snapshot may be selected based on its correspondence to the most recent first storage snapshot(s), although an older first storage snapshot may be selected, as discussed elsewhere herein.

The DR orchestrator 108, in further embodiments, can generate one or more fourth storage snapshots (block 708). The fourth storage snapshot(s) can be generated by changing/modifying/adding data to the third storage snapshot(s).

Figure 8:
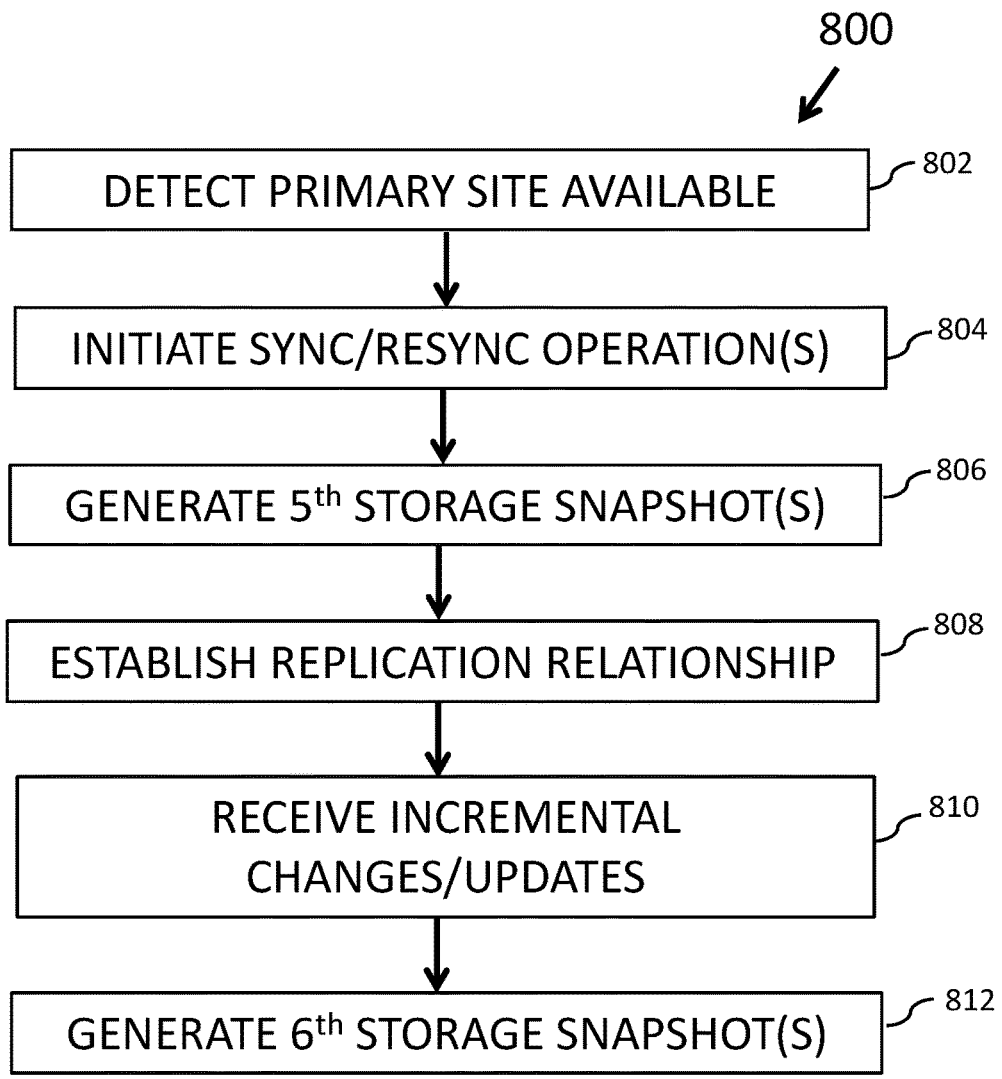
FIG. 8 is a schematic flow chart diagram illustrating one embodiment of a method for performing synchronization and/or resynchronization operations on the storage systems of FIGS. 1A-1C.

With reference to FIG. 8, FIG. 8 is a schematic flow chart diagram illustrating one embodiment of a method 800 for performing synchronization and/or resynchronization operations on a storage system 100. The method 800, in some embodiments, occurs subsequent to the method 700 discussed with reference to FIG. 7.

At least in the illustrated embodiment, the method 800 can begin with the DR orchestrator 108 determining that the primary site 104 is online or available (block 802) and initiating the synchronization and/or resynchronization operations (block 804). The DR orchestrator 108 can further generate one or more fifth storage snapshots on the primary site 104 (block 806).

The fifth storage snapshot(s) may be generated by converting one or more first storage snapshots from the first snapshot format to the second snapshot format, which is utilized on the backup site 106. As such, the fifth storage snapshot(s) can be considered the same as or similar to one or more third storage snapshot(s) generated on the backup site 106 provided that they are based on the same first storage snapshot(s).

The DR orchestrator 108 can establish a second replication relationship in a second replication mode between the primary site 104 and the backup site 106 (block 808). In one embodiment, the second replication relationship in the second replication mode may indicate that the corresponding storage volumes on the primary site 104 and the backup site 106 include the same data apart from any modifications performed on and/or included in the data on the backup site 106 resulting from I/O operations during the period in which the primary site 104 was offline/unavailable, as discussed elsewhere herein.

In various embodiments, the DR orchestrator 108 can receive the incremental changes/updates in the fourth storage snapshot(s) and/or the fourth storage snapshot(s) (block 810). The DR orchestrator 108 may combine the incremental changes/updates and the fifth storage snapshot(s) to generate one or more sixth storage snapshot(s) including the second snapshot format (block 812).

Figure 9:
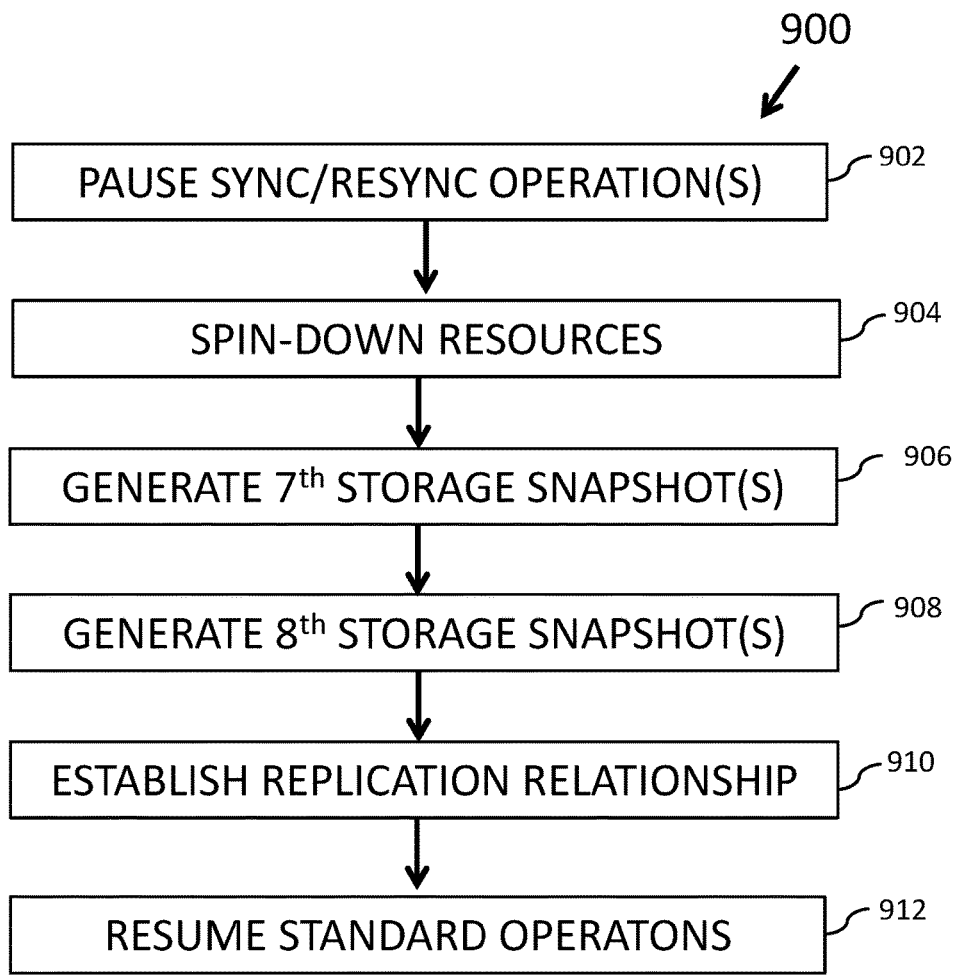
FIG. 9 is a schematic flow chart diagram illustrating one embodiment of a method for performing failback operations on the storage systems of FIGS. 1A-1C.

Referring now to FIG. 9, FIG. 9 is a schematic flow chart diagram illustrating one embodiment of a method 900 for performing failback operations on a storage system 100. The method 900, in some embodiments, occurs subsequent to the method 800 discussed with reference to FIG. 8.

At least in the illustrated embodiment, the method 900 can begin with the DR orchestrator 108 pausing and/or stopping synchronization/resynchronization operations for a predetermined amount of time (block 902). The resources on the backup site 106 can be spun-down and returned to a status in which the resource(s) are reserved and not allocated (block 904).

In various embodiments, the DR orchestrator 108 can generate one or more seventh storage snapshot(s) including the first snapshot format based on the sixth storage snapshot(s) (block 906). The seventh storage snapshot(s) may be generated, in some embodiments, by converting the sixth storage snapshot(s) from the second snapshot format to the first snapshot format.

The DR orchestrator 108 can perform and/or facilitate image conversion on the primary site 104 and the backup site 106 so that the data on both sites match. That is, the DR orchestrator can generate one or more eighth storage snapshots by converting the fourth storage snapshot(s) from the second snapshot format to the first snapshot format (block 908).

The DR orchestrator 108 can establish a third replication relationship in a third replication mode between the primary site 104 and the backup site 106 (block 910). In one embodiment, the third replication relationship in the third replication mode may indicate that the corresponding storage volumes on the primary site 104 and the backup site 106 include the same data and synchronization/resynchronization may be withheld, as discussed elsewhere herein. With data on the primary site 104 and the backup site matching, the storage system 100 may then return to its standard operations (block 912).

Figure 10:
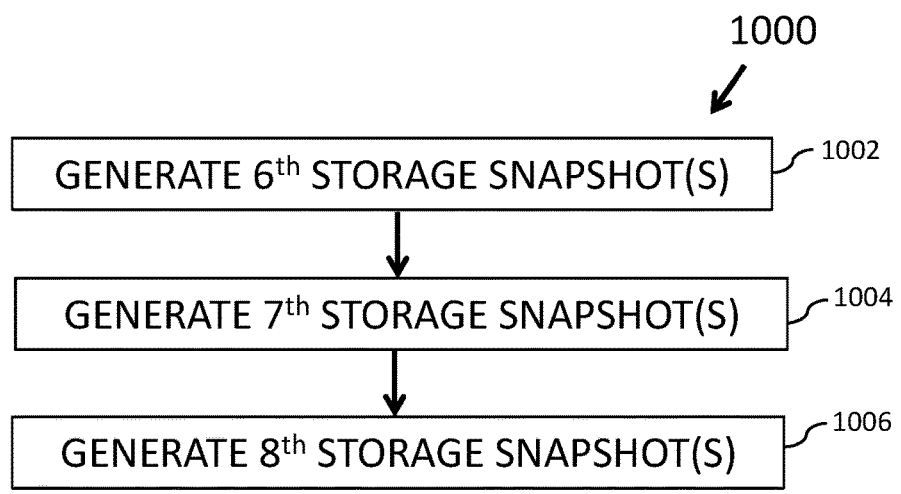
FIG. 10 is a schematic flow chart diagram illustrating one embodiment of a method for integrating resources at a backup site.

FIG. 10 is a schematic flow chart diagram illustrating one embodiment of a method 1000 for integrating resources at a backup site 106. At least in the illustrated embodiment, the method 1000 begins by a DR orchestrator 108 generating one or more sixth storage snapshots including the second snapshot format (block 1002). A sixth storage snapshot may be generated by combining the incremental changes/updates to mirrored data on the backup site 106, as represented by one or more fourth storage snapshots, and one or more fifth storage snapshots in which the fifth storage snapshot(s) may be generated by converting one or more first storage snapshots from the first snapshot format to the second snapshot format.

The DR orchestrator 108, in some embodiments, can generate one or more seventh storage snapshots including the first snapshot format on the primary site 104 (block 1004). The seventh storage snapshots may be generated by converting the sixth storage snapshot(s) from the second snapshot format to the first snapshot format.

In further embodiments, the DR orchestrator 108 can generate one or more eighth storage snapshots including the first snapshot format on the backup site 106 (block 1006). The eighth storage snapshots may be generated by converting the fourth storage snapshot(s) from the second snapshot format to the first snapshot format.

As such, the seventh storage snapshot(s) and the eighth storage snapshot(s) include the same data in the same snapshot format on the primary site 104 and the backup site 106, respectively. In this manner, system 100 may be synchronized/resynchronized without copying data between the primary site 104 and the backup site 106 when resuming normal operation. In other words, system 100 may be synchronized/resynchronized using the incremental changes or delta to the data mirrored on the backup site 106 while the primary site 104 was offline/unavailable.

Further, incremental synchronization/resynchronization can proceed while the backup site 106 is operational and actively changing the data thereon. In this manner, the downtime of an application that is operating on system 100 can be minimized or, at least, reduced since the application may not be down/offline during synchronization/resynchronization operations.

The embodiments may be practiced in other specific forms. The described embodiments are to be considered in all respects only as illustrative and not restrictive. The scope of the technology is, therefore, indicated by the appended claims rather than by the foregoing description. All changes which come within the meaning and range of equivalency of the claims are to be embraced within their scope.

What is claimed is:

1. A system, comprising:
    a disaster recovery orchestrator that detects when a primary site is online and offline;
    a resynchronization module that:
        generates, on the primary site in response to the primary site being back online, a set of sixth storage snapshots by combining a set of fifth storage snapshots that includes a second snapshot format utilized on a backup site and incremental changes to mirrored data on the backup site while the primary site is offline, the sixth storage snapshots including the second snapshot format, and converts the set of sixth storage snapshots from the second snapshot format to a first snapshot format utilized on the primary site to generate a set of seventh storage snapshots that includes the first snapshot format on the primary site; and a failback module that converts, on the backup site in response to the primary site being back online, a set of fourth storage snapshots including the incremental changes and the second snapshot format to the first snapshot format to generate a set of eighth storage snapshots that includes the first snapshot format on the backup site, wherein:
the set of seventh storage snapshots and the set of eighth storage snapshots include a same data in the first snapshot format, and at least a portion of the disaster recovery orchestrator, the resynchronization module and the failback module comprises one or more of computer hardware and executable code, the executable code stored on one or more non-transitory computer-readable storage media.

2. The system of claim 1, further comprising:
a failover module that:
generates a set of third storage snapshots including the second snapshot format, and
modifies the set of third storage snapshots to generate the set of fourth storage snapshots,
wherein the modifications to the set of third storage snapshots include the incremental changes.

3. The system of claim 2, wherein the failover module further:
generates a set of second storage snapshots including the first snapshot format; and
converts the first snapshot format in the set of second storage snapshots to the second snapshot format to generate the set of third storage snapshots.

4. The system of claim 3, wherein the failover module further:
receives, from the primary site, a set of first storage snapshots in the first format; and
stores the set of first storage snapshots on the backup site to generate the set of second storage snapshots.

5. The system of claim 2, further comprising:
a detection module that detects the availability of the primary site,
wherein the failover module generates the set of third storage snapshots in response to the detection module detecting that the primary site is unavailable.

6. The system of claim 1, wherein the resynchronization module further:
generates the set of fifth storage snapshots based on a set of first storage snapshots stored on the primary site, the set of first storage snapshots including the first snapshot format and are based on data stored on the primary site.

7. The system of claim 6, wherein the resynchronization module further:
converts the first snapshot format in the set of first storage snapshots to the second snapshot format to generate the set of fifth storage snapshots.

8. The system of claim 1, wherein the failback module further:
establishes a replication relationship between the primary site and the backup site in a mode that indicates that the primary site and the backup site store a same data in response to the failback module generating the set of eighth storage snapshots and the resynchronization module generating the set of seventh storage snapshots.

9. The system of claim 1, wherein the resynchronization module further:
establishes a replication relationship between the primary site and the backup site in a mode that indicates that the primary site and the backup site include a same data apart from one or more modifications performed on data on the backup site during a period in which the primary site was unavailable.

10. The system of claim 1, wherein:
the failback module further facilitates the primary site resuming operations in a normal mode;
the set of seventh storage snapshots and the eighth storage snapshots include a same snapshot format and represent a same data; and
data stored on the primary site and the backup site are synchronized prior to the primary site resuming operations in the normal mode.

11. A method, comprising:
detecting when a primary site is online and offline;
generating, on the primary site in response to the primary site being back online, a set of sixth storage snapshots by combining a set of fifth storage snapshots that includes a second snapshot format utilized on a backup site and incremental changes to mirrored data on the backup site while the primary site is offline, the sixth storage snapshots including the second snapshot format;
converting the set of sixth storage snapshots from the second snapshot format to a first snapshot format utilized on the primary site to generate a set of seventh storage snapshots that includes the first snapshot format on the primary site; and
converting, on the backup site in response to the primary site being back online, a set of fourth storage snapshots including the incremental changes and the second snapshot format to the first snapshot format to generate a set of eighth storage snapshots that includes the first snapshot format on the backup, wherein:
the set of seventh storage snapshots and the eighth storage snapshots include a same snapshot format and represent a same data, and data stored on the primary site and the backup site are synchronized prior to the primary site resuming operations in a normal mode subsequent to the primary site being back online.

12. The method of claim 11, further comprising:
generating a set of third storage snapshots including the second snapshot format; and
modifying the set of third storage snapshots to generate the set of fourth storage snapshots,
wherein the modifications to the set of third storage snapshots include the incremental changes.

13. The method of claim 12, further comprising:
generating a set of second storage snapshots including the first snapshot format;
converting the first snapshot format in the set of second storage snapshots to the second snapshot format to generate the set of third storage snapshots;
receiving, from the primary site, a set of first storage snapshots in the first format; and
storing the set of first storage snapshots on the backup site to generate the set of second storage snapshots.

14. The method of claim 11, further comprising:
generating the set of fifth storage snapshots based on a set of first storage snapshots stored on the primary site, the set of first storage snapshots including the first snapshot format and are based on data stored on the primary site; and
converting the first snapshot format in the set of first storage snapshots to the second snapshot format to generate the set of fifth storage snapshots.

15. The method of claim 11, further comprising one of:
establishing a first replication relationship between the primary site and the backup site in a first mode that indicates that the primary site and the backup site include a same data apart from one or more modifications performed on data on the backup site during a period in which the primary site was unavailable; and
in response to generating the set of eighth storage snapshots and generating the set of seventh storage snapshots, establishing a first replication relationship between the primary site and the backup site in a first mode that indicates that the primary site and the backup site store a same data.

16. A computer program product comprising a computer-readable storage medium including program instructions embodied therewith, the program instructions executable by a processor to cause the processor to:
detect when a primary site is online and offline;
generate, on the primary site in response to the primary site being back online, a set of sixth storage snapshots by combining a set of fifth storage snapshots that includes a second snapshot format utilized on a backup site and incremental changes to mirrored data on the backup site while the primary site is offline, the sixth storage snapshots including the second snapshot format;
convert the set of sixth storage snapshots from the second snapshot format to a first snapshot format utilized on the primary site to generate a set of seventh storage snapshots that includes the first snapshot format on the primary site; and
convert, on the backup site in response to the primary site being back online, a set of fourth storage snapshots including the incremental changes and the second snapshot format to the first snapshot format to generate a set of eighth storage snapshots that includes the first snapshot format on the backup site,
wherein:
the set of seventh storage snapshots and the eighth storage snapshots include a same snapshot format and represent a same data, and data stored on the primary site and the backup site are synchronized prior to the primary site resuming operations in a normal mode subsequent to the primary site being back online.
converting the set of sixth storage snapshots from the second snapshot format to a first snapshot format utilized on the primary site to generate a set of seventh storage snapshots that includes the first snapshot format on the primary site; and
converting, on the backup site in response to the primary site being back online, a set of fourth storage snapshots including the incremental changes and the second snapshot format to the first snapshot format to generate a set of eighth storage snapshots that includes the first snapshot format on the backup,
wherein:
the set of seventh storage snapshots and the eighth storage snapshots include a same snapshot format and represent a same data, and data stored on the primary site and the backup site are synchronized prior to the primary site resuming operations in a normal mode subsequent to the primary site being back online.

17. The computer program product of claim 16, wherein the program instructions further cause the processor to:
generate a set of third storage snapshots including the second snapshot format; and
modify the set of third storage snapshots to generate the set of fourth storage snapshots,
wherein the modifications to the set of third storage snapshots include the incremental changes.

18. The computer program product of claim 17, wherein the program instructions further cause the processor to:
generate a set of second storage snapshots including the first snapshot format;
convert the first snapshot format in the set of second storage snapshots to the second snapshot format to generate the set of third storage snapshots;
receive, from the primary site, a set of first storage snapshots in the first format; and
store the set of first storage snapshots on the backup site to generate the set of second storage snapshots.

19. The computer program product of claim 16, wherein the program instructions further cause the processor to:
generate the set of fifth storage snapshots based on a set of first storage snapshots stored on the primary site, the set of first storage snapshots including the first snapshot format and are based on data stored on the primary site; and
convert the first snapshot format in the set of first storage snapshots to the second snapshot format to generate the set of fifth storage snapshots.

20. The computer program product of claim 16, wherein the program instructions further cause the processor to one of:
establish a first replication relationship between the primary site and the backup site in a first mode that indicates that the primary site and the backup site include a same data apart from one or more modifications performed on data on the backup site during a period in which the primary site was unavailable; and
in response to generating the set of eighth storage snapshots and generating the set of seventh storage snapshots, establish a first replication relationship between the primary site and the backup site in a first mode that indicates that the primary site and the backup site store a same data.

* * * * *